(12) United States Patent
Motomura et al.

(10) Patent No.: US 10,133,047 B2
(45) Date of Patent: Nov. 20, 2018

(54) IMAGE FORMING APPARATUS, IMAGE FORMING METHOD, IMAGE FORMING SYSTEM, AND RECORDING MEDIUM

(71) Applicant: Panasonic Intellectual Property Management Co., Ltd., Osaka (JP)

(72) Inventors: Hideto Motomura, Kyoto (JP); Yasuhiko Adachi, Hyogo (JP); Yoshihisa Kato, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 605 days.

(21) Appl. No.: 14/682,099

(22) Filed: Apr. 9, 2015

(65) Prior Publication Data

US 2015/0309301 A1    Oct. 29, 2015

(30) Foreign Application Priority Data

Apr. 25, 2014    (JP) .................................. 2014-090909
Nov. 27, 2014    (JP) .................................. 2014-240338

(51) Int. Cl.
*G02B 21/06*   (2006.01)
*G02B 21/36*   (2006.01)
*G02B 21/00*   (2006.01)

(52) U.S. Cl.
CPC ......... *G02B 21/06* (2013.01); *G02B 21/0008* (2013.01); *G02B 21/361* (2013.01)

(58) Field of Classification Search
CPC ... G02B 21/06; G02B 21/0008; G02B 21/361
See application file for complete search history.

(56) References Cited

U.S. PATENT DOCUMENTS

| 5,307,161 A | 4/1994 | Miyamoto |
| 2010/0104173 A1* | 4/2010 | Yoshida ........... G01N 21/95684 |
| | | 382/145 |

(Continued)

FOREIGN PATENT DOCUMENTS

| JP | 4-316478 | 11/1992 |
| JP | 2009-128726 | 6/2009 |
| WO | 2012/094523 | 7/2012 |

*Primary Examiner* — Joseph G Ustaris
*Assistant Examiner* — Jill D Sechser
(74) *Attorney, Agent, or Firm* — Wenderoth, Lind & Ponack, L.L.P.

(57) ABSTRACT

An image forming apparatus includes an imager that is electrically connected to an image sensor disposed at a position where light that has passed through a sample slice is incident on the image sensor, and an illumination system that emits illumination light successively in different illumination directions relative to a sample slice to illuminate the sample slice with the illumination light and that emits a first light having a peak in a first wavelength range and a second light having a peak in a second wavelength range. The image forming apparatus obtains a plurality of first-color images with the image sensor while the sample slice is being illuminated with the first light serving as the illumination light successively in the different illumination directions. The image forming apparatus obtains at least one second-color image with the image sensor while the sample slice is being illuminated with the second light in at least one of the different illumination directions. The image forming apparatus generates a high-resolution image on the basis of the plurality of first-color images and the at least one second-color image.

13 Claims, 30 Drawing Sheets

(56) References Cited

U.S. PATENT DOCUMENTS

| | | | | |
|---|---|---|---|---|
| 2012/0050850 A1* | 3/2012 | Yamamoto | ............. | G02B 21/18 |
| | | | | 359/372 |
| 2012/0236137 A1* | 9/2012 | Kawashima | ........... | G02B 5/005 |
| | | | | 348/79 |
| 2013/0169788 A1* | 7/2013 | Tsuji | .................... | G02B 21/365 |
| | | | | 348/79 |
| 2013/0280752 A1* | 10/2013 | Ozcan | ................ | G01N 21/4795 |
| | | | | 435/29 |
| 2014/0252200 A1* | 9/2014 | Garsha | ................. | G02B 21/367 |
| | | | | 250/201.3 |
| 2014/0347460 A1* | 11/2014 | Richfield | ............. | G02B 21/367 |
| | | | | 348/79 |
| 2016/0161731 A1* | 6/2016 | Brueck | ............. | G02B 21/0056 |
| | | | | 348/49 |

* cited by examiner

IMAGE FORMING APPARATUS, IMAGE FORMING METHOD, IMAGE FORMING SYSTEM, AND RECORDING MEDIUM

BACKGROUND

1. Technical Field

The present disclosure relates to image forming apparatuses, image forming methods, image forming systems, and recording media.

2. Description of the Related Art

In a pathological diagnosis, tissue is excised from an internal organ or a tumor and examined to make a definite diagnosis of disease or to determine the spread of a lesion. The excised tissue section is then sliced to a thickness of several microns so that a tissue slice can be observed under a microscope, and a pathology slide (specimen) is created by placing the tissue slice between glass plates. A pathological diagnosis is made to determine whether the cancer is benign or malignant, and thus the number of specimens created per day for pathological diagnoses at a hospital is as high as several hundred. Unlike radiographic images or the like, pathological specimens cannot be saved in the form of electronic data. Therefore, it is typical to preserve the specimens so that the created specimens can be examined at a later time.

Conventionally, microscopes are used to observe microstructures, such as biological tissue. A microscope magnifies light that has passed through a subject or light reflected by a subject through a lens. An examiner directly observes an image formed by the magnified light. If a digital microscope that captures a microscopy image with a camera and displays the image on a display is used, multiple people can observe the image at the same time or observe the image at remote locations. The camera is disposed at a focal point of the microscope and captures the image that has been magnified by a lens of the microscope.

Japanese Unexamined Patent Application Publication No. 4-316478 discloses a technique for observing a microstructure through a contact image sensing (CIS) method. In the CIS method, a subject is placed directly on an image sensor, and an image of the subject is captured. The image is not magnified by a lens, and thus the pixel size of the image sensor determines the resolution. In other words, the smaller pixel size enables a more detailed image of a microstructure to be captured.

As stated above, when an image is captured by using a conventional CIS method, a resolution that exceeds the resolution determined by the pixel size of the image sensor cannot be achieved.

SUMMARY

One non-limiting and exemplary embodiment provides an image forming apparatus that can achieve a resolution that exceeds the resolution determined by the pixel size of an image sensor.

In one general aspect, the techniques disclosed here feature an image forming apparatus that includes an imager that is electrically connected to an image sensor disposed such that light that has passed through a sample slice is incident thereon, an illumination system that emits illumination light successively in different illumination directions relative to the sample slice to illuminate the sample slice with the illumination light and that emits a first light having a peak in a first wavelength range and a second light having a peak in a second wavelength range, a controller that is connected to the imager and to the illumination system and that controls the imager and the illumination system, and an image processor that obtains data of a plurality of images from the image sensor and combines the plurality of images to generate a high-resolution image of the sample slice that has a resolution higher than a resolution of each of the plurality of images. The controller obtains a plurality of first-color images with the image sensor while the sample slice is being illuminated with the first light serving as the illumination light successively in the different illumination directions, and obtains at least one second-color image with the image sensor while the sample slice is being illuminated with the second light serving as the illumination light in at least one of the different illumination directions. The image processor generates the high-resolution image on the basis of the plurality of first-color images and the at least one second-color image.

According to the present disclosure, a microscope that does not include a lens can be provided, and thus space-savings and cost-savings can be achieved.

It should be noted that general or specific embodiments may be implemented as a system, a method, an integrated circuit, a computer program, a computer-readable storage medium, or any selective combination thereof. A computer-readable storage medium includes, for example, a non-transitory storage medium, such as a compact-disc read-only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the medical field, microscopes are used to observe cells. Observation of cell shape can make it possible to determine whether a patient has a disease; and if the patient has a disease, the benignity or the degree of malignancy of the disease can be determined. In a type of diagnosis called a pathological diagnosis, a specimen taken from a patient is sliced to a thickness of approximately 4 µm to observe the cells therein. The cells are translucent, and a microscopy image thereof has low contrast. Therefore, the cells are subjected to staining so that the structure of the cells can be seen more easily.

Figure 1:
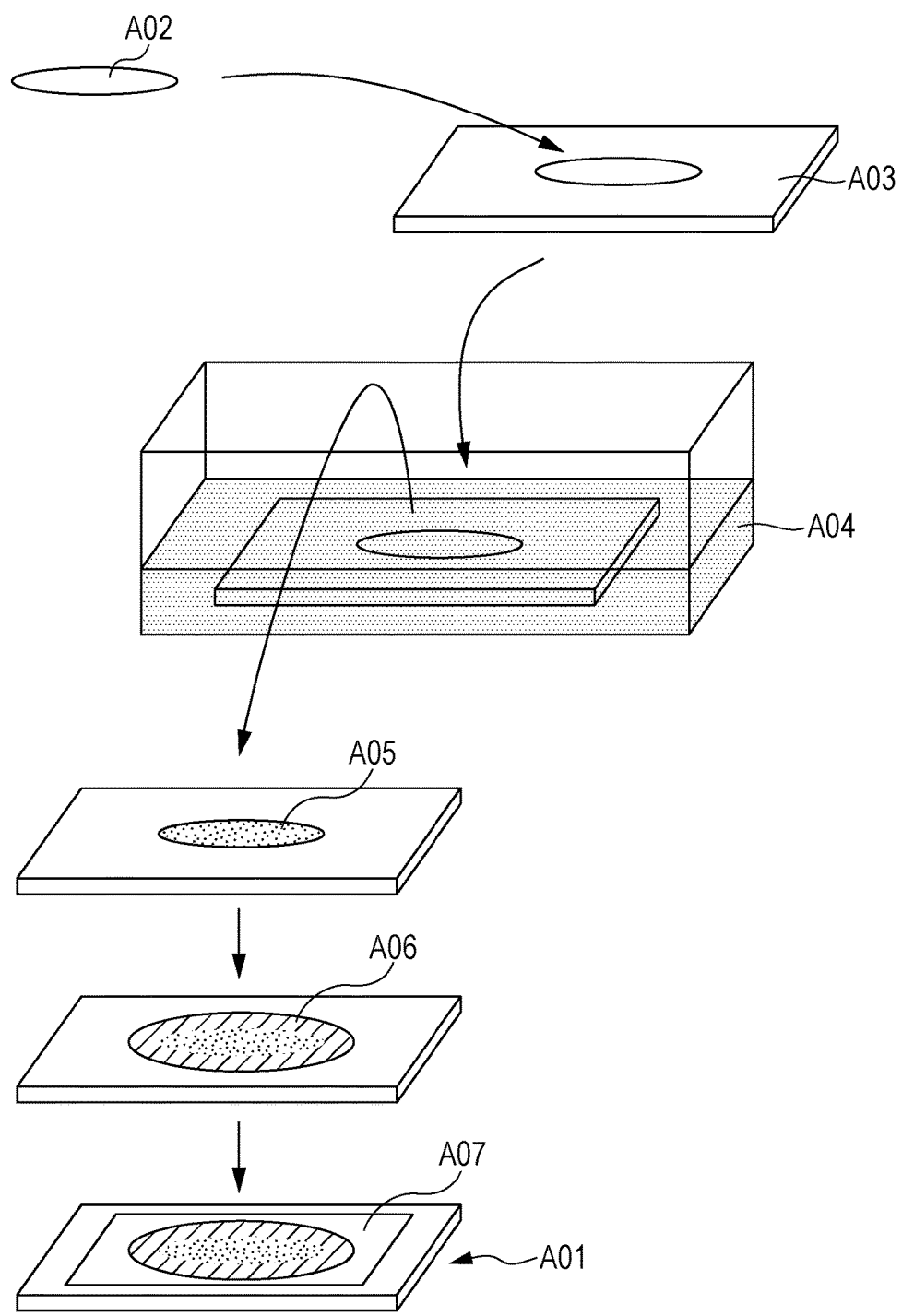
FIG. 1 illustrates an exemplary method for creating a prepared specimen for a pathological diagnosis.

With reference to FIG. 1, an exemplary method for creating a prepared specimen A01 for a pathological diagnosis is described.

As illustrated in FIG. 1, a slice A02 is placed on a slide (transparent plate) A03. The slide A03 typically has a thickness of 1 mm, a length of 76 mm, and a width of 26 mm. The slice A02, along with the slide A03, is immersed in a stain solution A04 and is thus stained. Upon staining the slice A02, the slice A02 turns into a sample slice (hereinafter, also referred to as a stained slice) A05. A mounting medium A06 is applied to the slide A03 in order to protect and secure the stained slice A05. Thereafter, a cover slip A07 is placed, and the prepared specimen A01 is thus completed.

Figure 2:
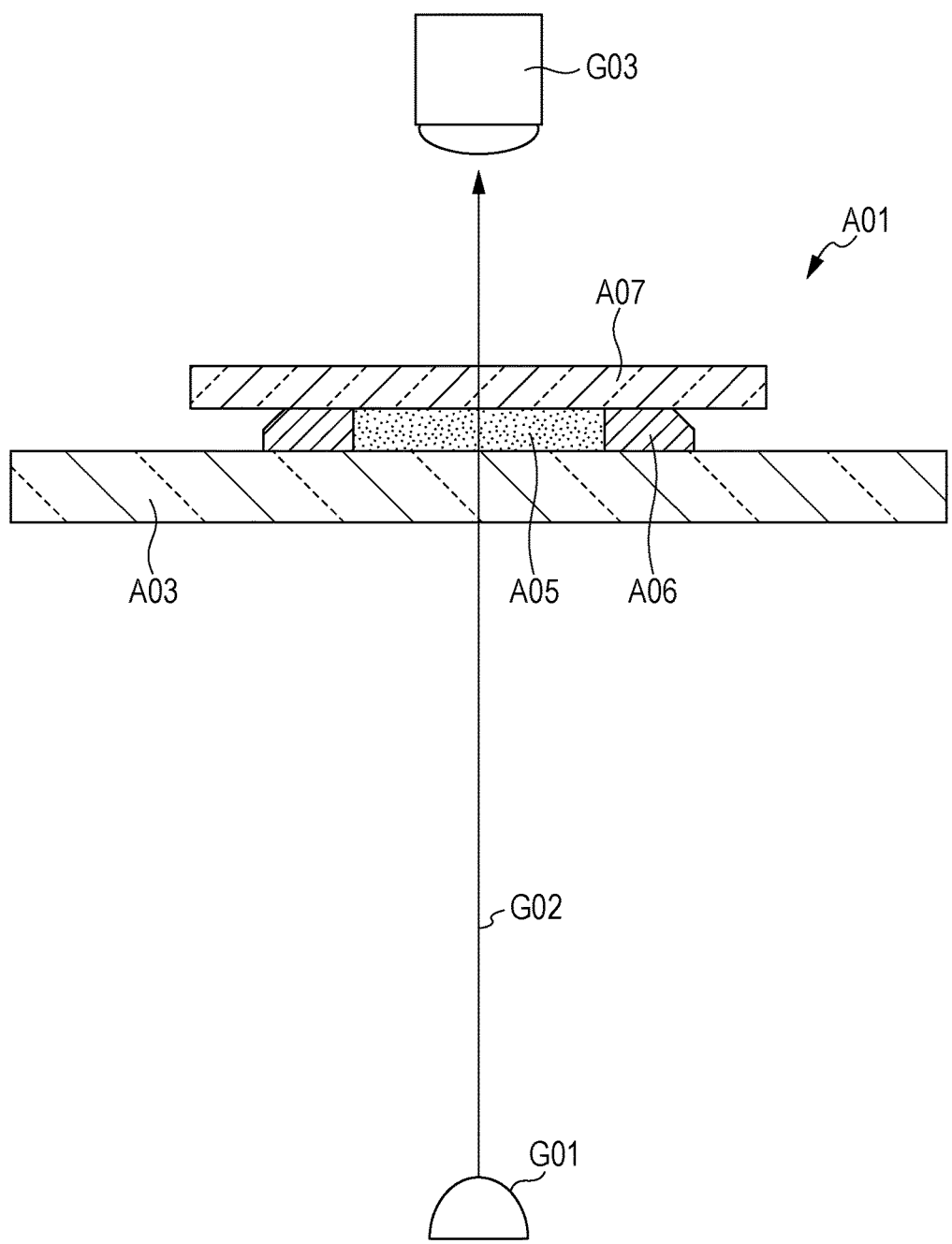
FIG. 2 schematically illustrates a section of the prepared specimen being observed under a microscope.

FIG. 2 schematically illustrates a section of the prepared specimen A01 being observed under a microscope.

As illustrated in FIG. 2, the stained slice A05 is placed on the slide A03. The cover slip A07 is fixed to the slide A03 with the mounting medium A06 provided therebetween. The stained slice A05 is surrounded by the mounting medium A06 such that it is located between the cover slip A07 and the slide A03.

When the prepared specimen A01 is placed under an optical microscope for observation, the prepared specimen A01 is illuminated, at a lower side thereof, with illumination light G02 emitted by a light source G01. The illumination light G02 passes through the slide A03, the stained slice A05, the mounting medium A06, and the cover slip A07 and is incident on an objective lens G03 of the microscope.

When the prepared specimen A01 is observed under such an optical microscope, there arises a problem in that it takes time to set the magnification or observation area.

Subsequently, a principle of a CIS observation method is described with reference to FIG. 3.

Figure 3:
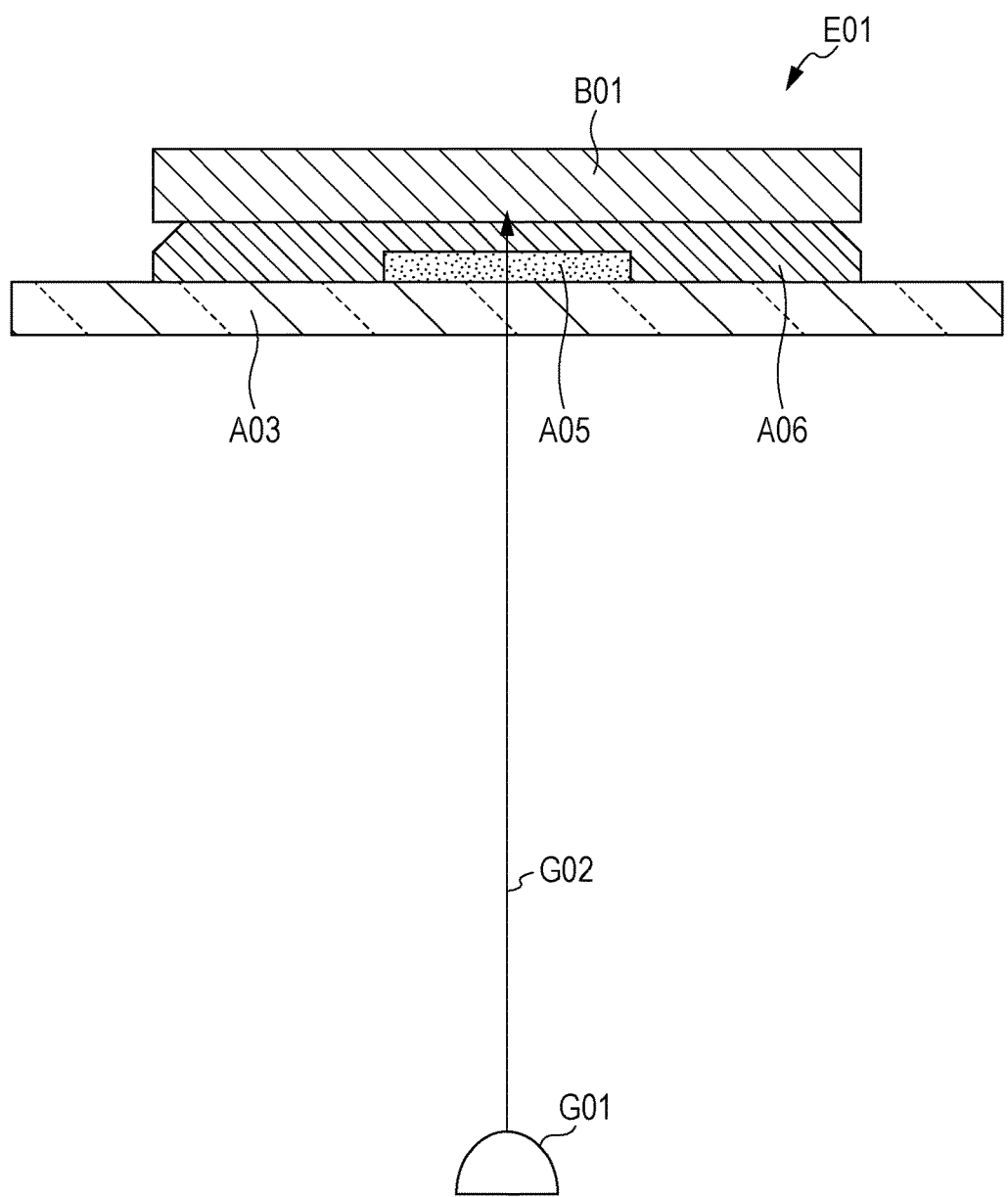
FIG. 3 is an illustration for describing a principle of a CIS observation method.

A prepared specimen E01 illustrated in FIG. 3 includes an image sensor B01, in place of the cover slip A07. The prepared specimen E01 includes a transparent plate (in this example, a slide) A03, the image sensor B01, and a stained slice (subject) A05, which is surrounded by the mounting medium A06. The image sensor B01 is fixed to the slide A03 with the mounting medium A06 provided therebetween. As the image sensor B01, a solid-state image sensor may be used in which photoelectric converters are arrayed in a matrix on an imaging surface. Each photoelectric converter is typically a photodiode provided on a semiconductor layer or on a semiconductor substrate. The photoelectric converters receive incident light and generate electric charge. The resolution of a two-dimensional image sensor is dependent on the array pitch or the array density of photoelectric converters arrayed on the imaging surface. In recent years, the array pitch of photoelectric converters has been reduced to be equal to visible-light wavelengths. A typical example of the image sensor B01 is a charge-coupled device (CCD) image sensor or a metal-oxide semiconductor (MOS) image sensor.

When an image is to be captured, the illumination light G02 passes through the Aide A03, the stained slice A05, and the mounting medium A06, and reaches the image sensor B01 in the prepared specimen E01. The image sensor B01 is electrically connected to circuitry (not illustrated) and carries out an imaging operation. The image sensor B01 captures an image of the stained slice A05 and outputs an image signal corresponding to an optical transmittance distribution (density distribution) of the stained slice A05. Consequently, an image of the stained slice A05 is obtained.

According to such a CIS observation method, an optical system, such as a lens, is not present between the element that captures an image and the stained slice A05 (subject). Nonetheless, as minute photoelectric converters (photodiodes) are arrayed at high density on the imaging surface of the image sensor B01, an image showing the fine structure of the stained slice A05 can be obtained. Hereinafter, the resolution is briefly described.

The resolution of the optical microscope described above is defined by a two-point resolution. The resolution δ of two point light sources are expressed through the following expression (1) in accordance with the Rayleigh criterion.

$$\delta = \frac{0.61 \times \lambda}{NA} \quad (1)$$

Here, λ represents the wavelength of light, and NA represents the numerical aperture of an objective lens.

For example, when the numerical aperture NA of the objective lens is 0.25 and the wavelength λ is 555 nm, the resolution δ is 1.35 µm through the expression (1). To achieve a resolution equivalent to the resolution δ through the CIS method, the pixel pitch of an image sensor to be used may be set to 1.35 µm. If an image is to be captured with a resolution that is twice the aforementioned resolution, the pixel pitch of the image sensor may be reduced by one-half to approximately 0.6 µm. However, it is difficult to further miniaturize the pixel structure of an image sensor, and such miniaturization leads to an increase in fabrication cost.

According to an embodiment of the present disclosure, a subject is illuminated with light in multiple illumination directions relative to an image sensor, and multiple images are obtained by light that has passed through an area smaller than the size of a pixel. The obtained images are then combined to increase the resolution.

Typically, a color image sensor that includes a color mosaic filter is used to obtain a color image. However, the period at which pixels of the same color are arrayed in such an image sensor is extended, and thus the resolution decreases. To suppress such a decrease in the resolution, a monochrome image sensor that does not include a color mosaic filter may be used. Then, while a sample slice is illuminated with illumination light of different colors, such as red (R), green (G), and blue (B), in a time sequential manner, images may be captured under the illumination light of the respective colors. Through this, for example, a red (R) image, a green (G) image, and a blue (B) image are obtained. These images can then be combined to form a color image.

However, if, for example, the red (R) image, the green (G) image, and the blue (B) image are to be obtained for all illumination directions, the number of instances of imaging increases, and the amount of data of the obtained images becomes huge. According to an embodiment of the present disclosure, although such an increase in the amount of data is being suppressed, a high-resolution image can be obtained by employing configurations described hereinafter.

An overview of an aspect of the present disclosure is as follows.

An image forming apparatus according to one embodiment of the present disclosure includes an imager that is electrically connected to an image sensor disposed at a position where light that has passed through a sample slice is incident thereon, an illumination system that emits illumination light successively in different illumination directions relative to the sample slice and illuminates the sample slice with the illumination light, a controller that is connected to the imager and to the illumination system and that controls the imager and the illumination system, and an image processor that obtains data of a plurality of images from the image sensor and combines the plurality of images to generate a high-resolution image of the sample slice that has a resolution higher than a resolution of each of the plurality of images. The illumination system emits a first light having a peak in a first wavelength range and a second light having a peak in a second wavelength range. The controller obtains a plurality of first-color images with the image sensor while the sample slice is being illuminated with the first light serving as the illumination light successively in the different illumination directions. In addition, the controller obtains at least one second-color image with the image sensor while the sample slice is being illuminated with the second light serving as the illumination light in at least one of the different illumination directions. The image processor generates the high-resolution image on the basis of the plurality of first-color images and the at least one second-color image.

In one embodiment, the imager releasably supports a prepared specimen that includes the sample slice and the image sensor, and is electrically connected to the image sensor in a state in which the imager supports the prepared specimen.

In one embodiment, the illumination system illuminates the sample slice with the first light emitted in at least four different illumination directions. The image sensor obtains at least four different first-color images while the sample slice is being illuminated with the first light, and each of the at least four different first-color images is an image of a different portion of the sample slice. The image processor generates a high-resolution image of the sample slice on the basis of the at least four different first-color images.

In one embodiment, the illumination system emits a third light having a peak in a third wavelength range. The controller obtains at least one third-color image with the image sensor while the sample slice is being illuminated with the third light serving as the illumination light in at least one of the different illumination directions.

In one embodiment, the first light has a wavelength in a range of 495 nm to 570 nm inclusive. The second light has one of a wavelength in a range of 620 nm to 750 nm inclusive and a wavelength in a range of no less than 450 nm to less than 495 nm.

In one embodiment, the first light has a wavelength in a range of 495 nm to 570 nm inclusive. The second light has a wavelength in a range of 620 nm to 750 nm inclusive. The third light has a wavelength in a range of no less than 450 nm to less than 495 nm.

In one embodiment, the illumination system includes a light source that emits the illumination light, and the light source is moved successively to different positions corresponding to the respective different illumination directions.

In one embodiment, the illumination system includes a plurality of light sources that successively emit the illumination light, and the light sources are disposed at different positions corresponding to the respective different illumination directions.

In one embodiment, the illumination system includes a mechanism that changes at least one of positions and directions of the sample slice and the image sensor.

An image forming apparatus according to one embodiment includes an illumination angle adjuster that adjusts an angle at which the illumination light is incident on the sample slice. The illumination angle adjuster adjusts the angle at which the illumination light is incident on the sample slice in such a manner that the illumination light emitted successively in the different illumination directions by the illumination system passes through different portions of the sample slice and is incident on photoelectric converters of the image sensor.

An image forming method according to one embodiment of the present disclosure includes emitting illumination light successively in different illumination directions relative to a sample slice and illuminating the sample slice with the illumination light, obtaining a plurality of images corresponding to the respective illumination directions with an image sensor disposed at a position where light that has passed through the sample slice is incident thereon, and combining the plurality of images to generate a high-resolution image of the sample slice that has a resolution higher than a resolution of each of the plurality of images. The illuminating of the sample slice with the illumination light includes illuminating the sample slice with a first light having a peak in a first wavelength range in the different illumination directions and illuminating the sample slice with a second light having a peak in a second wavelength range in at least one of the different illumination directions. The obtaining of the plurality of images includes obtaining a plurality of first-color images while the sample slice is being illuminated with the first light serving as the illumination light successively in the different illumination directions, and obtaining at least one second-color image while the sample slice is being illuminated with the second light serving as the illumination light in at least one of the different illumination directions.

An image forming system according to one embodiment of the present disclosure includes an imager that is electrically connected to an image sensor disposed at a position where light that has passed through a sample slice is incident thereon, an illumination system that emits illumination light successively in different illumination directions relative to the sample slice and illuminates the sample slice with the illumination light, and a computer. The illumination system emits a first light having a peak in a first wavelength range and a second light having a peak in a second wavelength range. The computer executes obtaining a plurality of first-color images with the image sensor while the sample slice is being illuminated with the first light serving as the illumination light successively in the different illumination directions, obtaining at least one second-color image with the image sensor while the sample slice is being illuminated with the second light serving as the illumination light in at least one of the different illumination directions, and generating such a high-resolution image on the basis of the plurality of first-color images and the at least one second-color image that has a resolution higher than a resolution of each of the first-color images.

A recording medium according to one embodiment of the present disclosure is a non-transitory computer-readable recording medium storing a computer program to be used in the image forming system described above. The computer program causes the image forming system to execute obtaining a plurality of first-color images with the image sensor while the sample slice is being illuminated with the first light serving as the illumination light successively in the different illumination directions, obtaining at least one second-color image with the image sensor while the sample slice is being illuminated with the second light serving as the illumination light in at least one of the different illumination directions, and generating an image on the basis of the plurality of first-color images and the at least one second-color image that has a resolution higher than a resolution of each of the first-color images.

An image forming method according to the present disclosure includes emitting a first light having a peak in a first wavelength range in a first illumination direction, the first light emitted in the first illumination direction passing thorough a first portion of a sample to emit a first resulting light from the first portion; obtaining first direction data showing that the first light is emitted in the first illumination direction; receiving the first resulting light on an image sensor; outputting first image data based on the first resulting light received by the image sensor; emitting a second light having a peak in a second wavelength range in the first illumination direction, the second light emitted in the first illumination direction passing through the first portion of the sample to emit a second resulting light from the first portion; obtaining second direction data showing that the second light is emitted in the first illumination direction; receiving the second resulting light on the image sensor; outputting second image data based on the second resulting light received by the image sensor; emitting the first light in a second illumination direction, the first light emitted in the second illumination direction passing through a second portion of the sample to emit a third resulting light from the second portion; obtaining third direction data showing that the first light is emitted in the second illumination direction; receiving the third resulting light on the image sensor; outputting third image data based on the third resulting light received by the image sensor; and preparing a first image based on the first data, the second data, the third data, the first illumination direction, the second illumination direction, and the third illumination direction. In the image forming method, the second light is not emitted in the second direction.

An image forming apparatus according to an embodiment of the present disclosure includes an imager that releasably supports a prepared specimen that includes a sample slice and an image sensor disposed such that light that has passed through the sample slice is incident on the image sensor. A point to be noted here is that the image sensor forms a part of the prepared specimen. Such a prepared specimen may be called an electronic prepared specimen. The imager is electrically connected to the image sensor in a state in which the imager supports such a prepared specimen.

An image forming apparatus according to an embodiment of the present disclosure includes an illumination system that emits illumination light successively in different illumination directions relative to a sample slice and illuminates the sample slice with the illumination light. The illumination system is configured to emit a first light having a peak in a first wavelength range and a second light having a peak in a second wavelength range. In addition, the illumination system may be configured to emit a third light having a peak in a third wavelength range. The first light, for example, may have a wavelength in a range of 495 nm to 570 nm inclusive. The second light and the third light may have a wavelength in a range of 620 nm to 750 nm inclusive and a wavelength in a range of no less than 450 nm to less than 495 nm, respectively. For simplifying the description, light having a wavelength in a range of 495 nm to 570 nm inclusive may be referred to as green light, light having a wavelength in a range of 620 nm to 750 nm inclusive may be referred to as red light, and light having a wavelength in a range of no less than 450 nm to less than 495 nm may be referred to as blue light.

The specific configuration of the illumination system is not limited as long as the illumination system has a function to change the angle (illumination angle) of the illumination light incident on a sample slice. The illumination system may include one or both of a mechanism for moving a light source and a mechanism (e.g., gonio-mechanism) for moving a sample slice in order to change the illumination angle.

The image forming apparatus according to the present disclosure further includes a controller and an image processor. The controller is connected to the imager and to the illumination system and controls the imager and the illumination system. The image processor obtains data of a plurality of images from the image sensor in the prepared specimen supported by the imager and combines the plurality of images to generate a high-resolution image of the sample slice that has a resolution higher than a resolution of each of the plurality of images.

The controller is configured to obtain a plurality of first-color images with the image sensor while the sample slice is being illuminated with the first light serving as the illumination light successively in the different illumination directions. In addition, the controller is configured to obtain at least one second-color image with the image sensor while the sample slice is being illuminated with the second light serving as the illumination light in at least one of the different illumination directions. In one specific example, the first-color image may be an image obtained while the sample is being illuminated with the green light serving as the illumination light, and the second-color image may be an image obtained while the sample is being illuminated with the red light serving as the illumination light. The sample slice is typically stained a specific color, and even a color image of such a sample slice that is expressed through a mixture of two primary colors may include sufficiently useful information.

In addition, in a case in which the illumination system can emit the third light, the controller may be configured to obtain at least one third-color image with the image sensor while the sample slice is being illuminated with the third light serving as the illumination light in at least one of the different illumination directions. A color image expressed by a mixture of three primary colors can reproduce color information of an image to be visually perceived by the human eye at a high level and is suitable when a medical practitioner makes a diagnosis.

The image processor according to the present disclosure is configured to generate an image on the basis of the plurality of first-color images and the at least one second-color image that has a resolution higher than a resolution of each of the first-color images. As it becomes clear from the following description, an image generated by combining a plurality of first-color images obtained with the image sensor while the sample slice is being illuminated with the first light serving as the illumination light successively in the different illumination directions results in an image having a relatively high resolution. Meanwhile, at least one second-color image obtained with the image sensor while the sample slice is being illuminated with the second light serving as the illumination light in at least one of the different illumination directions results in an image having a relatively low resolution. Even if the resolution of some of the three primary color images is low, it is possible to generate a high-resolution combined image, and the image processor according to the present disclosure has been conceived of by paying attention to that feature.

Hereinafter, embodiments of the present disclosure are described in detail with reference to the drawings.

It is to be noted that the embodiments described hereinafter illustrate general or specific examples. The Numerical values, the shapes, the materials, the components, the arrangements, the positions, and the connection modes of the components, the steps, the order of the steps, and so forth indicated in the embodiments hereinafter are examples, and are not intended to limit the present disclosure. Furthermore, among the components in the embodiments hereinafter, a component that is not described in an independent claim indicating the broadest concept is considered to be an optional component.

It is to be noted that these general or specific embodiments may be implemented as a system, a method, an integrated circuit, a computer program, a computer-readable storage medium, or any selective combination thereof.

(First Embodiment)

Figure 4:
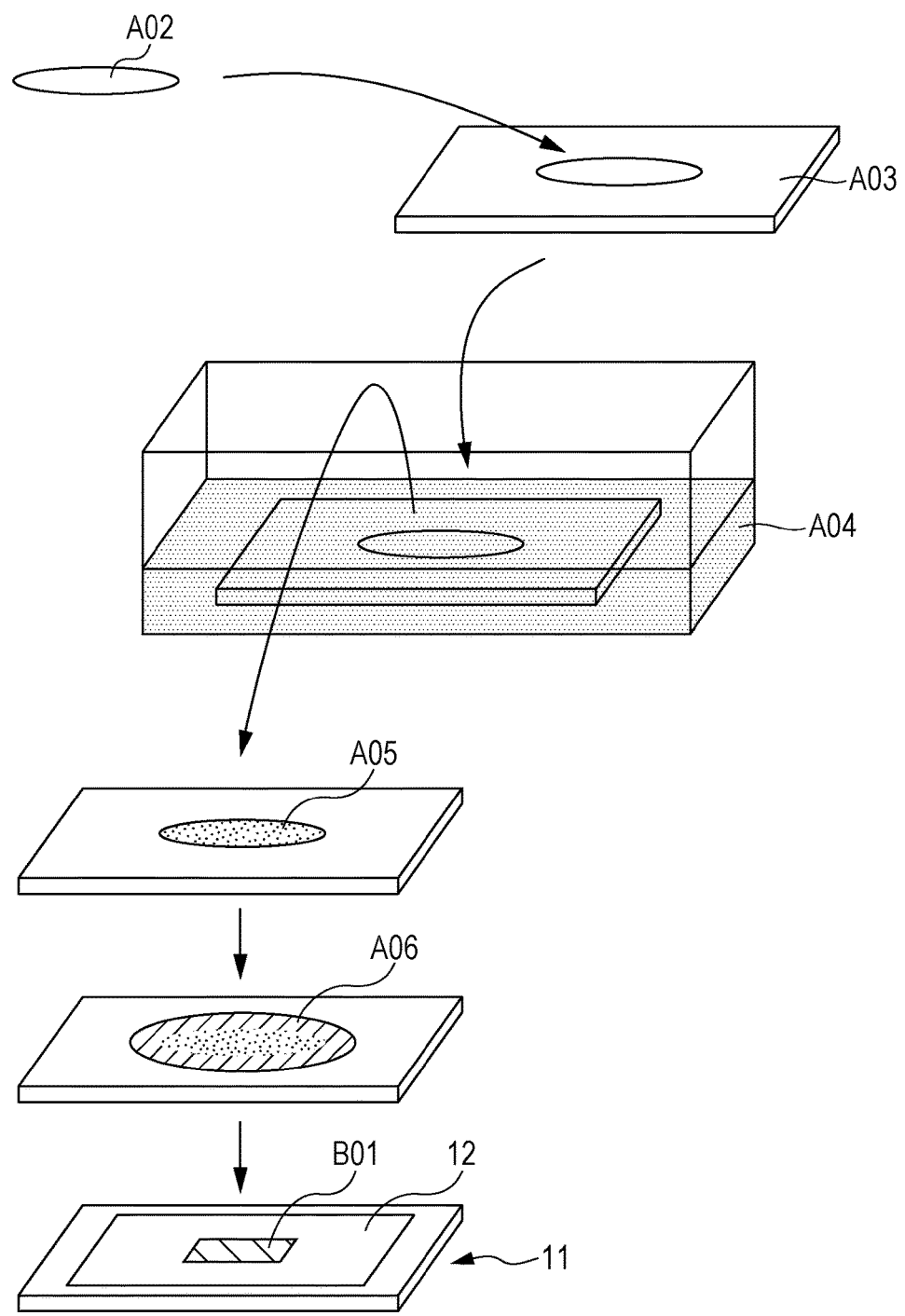
FIG. 4 illustrates an exemplary method for creating a prepared specimen according to a first embodiment of the present disclosure.

With reference to FIG. 4, an exemplary method for creating a prepared specimen according to an embodiment of the present disclosure is described.

As illustrated in FIG. 4, a slice A02 is placed on a slide (transparent plate) A03. The slice A02, along with the slide A03, is immersed in a stain solution A04 and is thus stained. Upon staining the slice A02, the slice A02 becomes a stained slice A05. A mounting medium A06 is applied to the slide A03 in order to protect and secure the stained slice A05. Thereafter, in place of the cover slip A07 illustrated in FIG. 1, an image sensor B01 is placed. In the example illustrated in FIG. 4, the image sensor B01 is connected, at its rear side, to a package 12. Thus, a prepared specimen 11 is completed.

Figure 5:
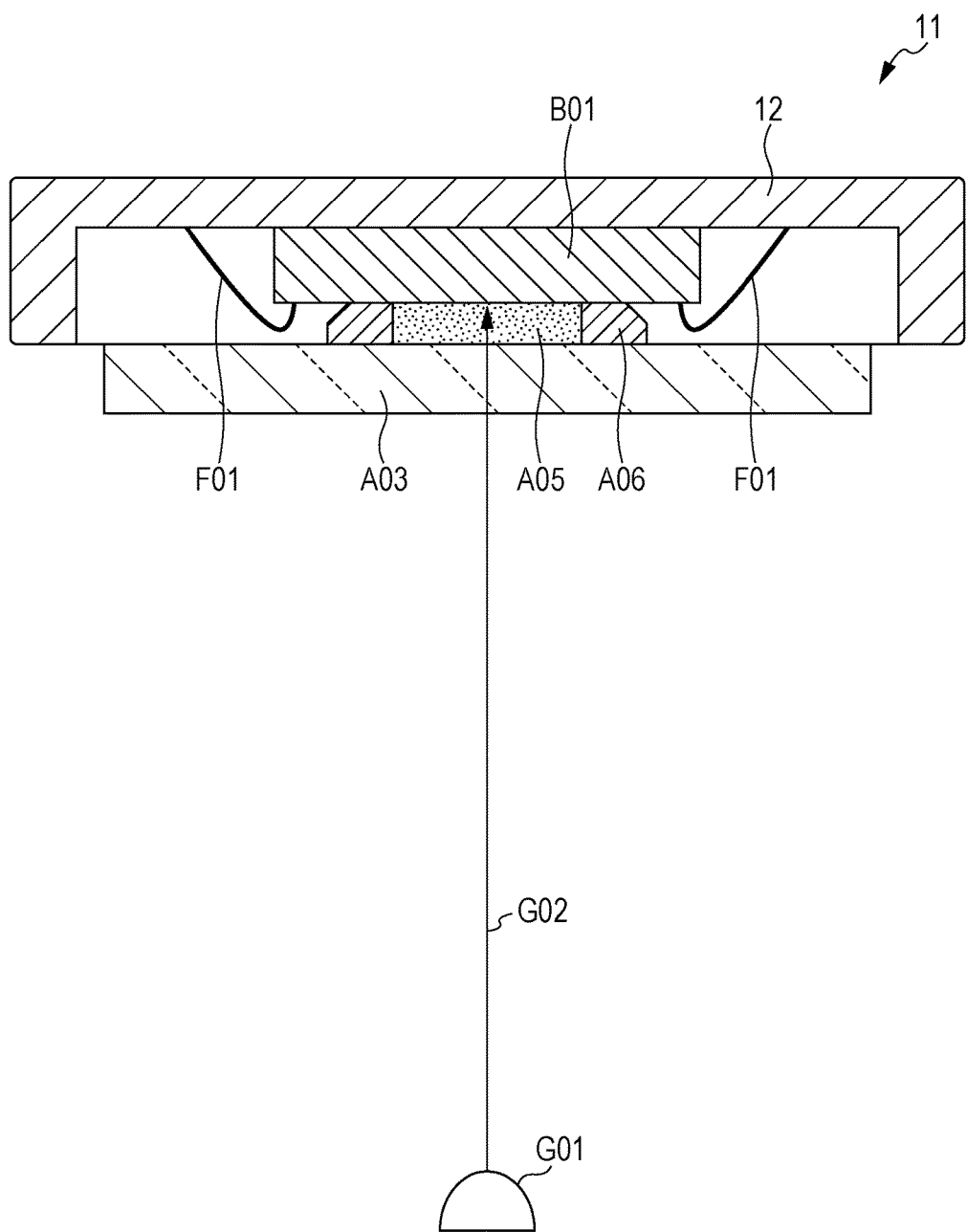
FIG. 5 schematically illustrates an exemplary configuration, along a section, of a prepared specimen that includes an image sensor and a package according to the first embodiment.

FIG. 5 schematically illustrates an exemplary configuration, along a section, of the prepared specimen 11, which includes the image sensor B01 and the package 12. In the example illustrated in FIG. 5, the image sensor B01 is contained in the package 12. The image sensor B01 and the package 12 are electrically interconnected through wire electrodes (bonding wires) F01. The electrical connection between the image sensor B01 and the package 12 is not limited to the example illustrated in FIG. 5, and the electrode F01 does not need to be wire-shaped. The package 12 illustrated in FIG. 5 includes a base and walls (side walls) that form a space in which the image sensor B01 is contained. The configuration of the image sensor B01 and the package 12 may be similar to the configuration of a known image sensor package. In the example illustrated in FIG. 5, the width (a dimension in the horizontal direction along the drawing plane) of the slide A03 is narrower than the width of the package 12. Alternatively, the width of the slide A03 may be greater than the width of the package 12.

Figure 6:
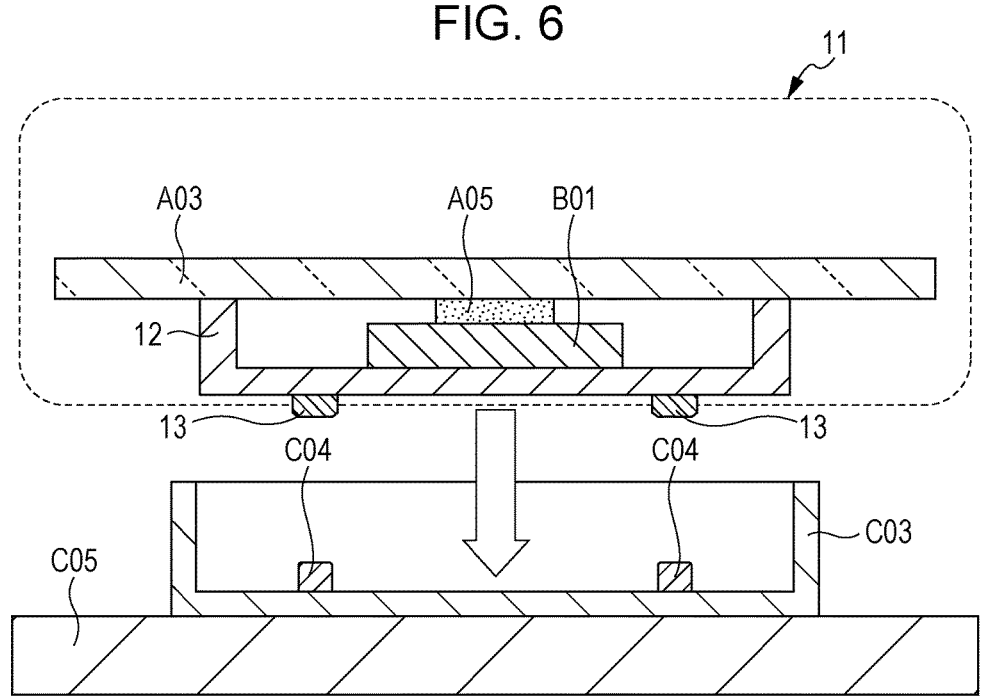
FIG. 6 schematically illustrates an exemplary configuration, along a section, of the prepared specimen and a socket.

FIG. 6 schematically illustrates the prepared specimen 11, which can be used in the embodiments of the present disclosure, and a portion of an imager, which releasably supports the prepared specimen 11. The overall configuration of the imager is described later. The imager includes a socket C03 configured to load the prepared specimen 11. The socket C03 is electrically connected to a circuit board C05. The electrical connection between the socket C03 and the circuit board C05 may be achieved, for example, as terminals provided on a rear side of the socket C03 make contact with wires or electrode pads provided on the circuit board C05. The circuit board C05 may have a known configuration, and may be, for example, a multilayer printed-circuit board. The socket C03 may be mounted on the circuit board C05 through any known method for mounting an electronic component on a circuit board. Terminals 13 are provided on a rear side of the package 12 for electrically connecting the image sensor B01 to external circuitry. The socket C03 includes terminals C04 arranged so as to be electrically connected to the respective terminals 13 provided on the package 12.

Figure 7:
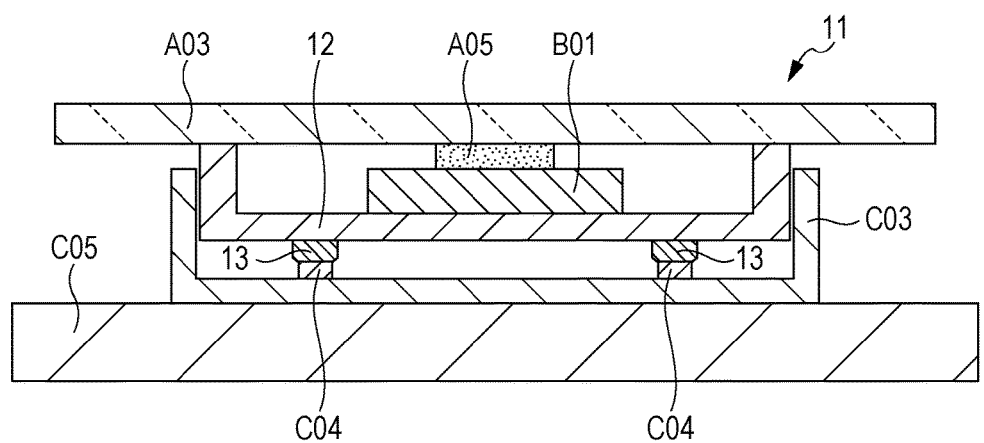
FIG. 7 schematically illustrates another exemplary configuration, along a section, of the prepared specimen and the socket.

FIG. 7 schematically illustrates an exemplary configuration in which the prepared specimen 11 is loaded on the socket C03. The prepared specimen 11 is tentatively fixed to the socket C03 through the socket C03 itself or through another mechanism. As the prepared specimen 11 is loaded on the socket C03, the terminals C04 on the socket C03 are electrically connected to the image sensor B01 through the terminals 13 on the package 12. The configuration of the socket C03 is not limited to this example. The electrical connection between the socket C03 and the image sensor B01 is not limited to the above example, either.

In the state illustrated in FIG. 7, the prepared specimen 11 is illuminated with illumination light from the upper side, and illumination light that has passed through the stained slice A05 is incident on the image sensor B01. In this manner, necessary images are captured in multiple instances. Upon imaging of a target prepared specimen 11 being completed, the prepared specimen 11 is removed from the socket C03. Then, a subsequent target prepared specimen 11 is loaded on the socket C03.

Figure 8:
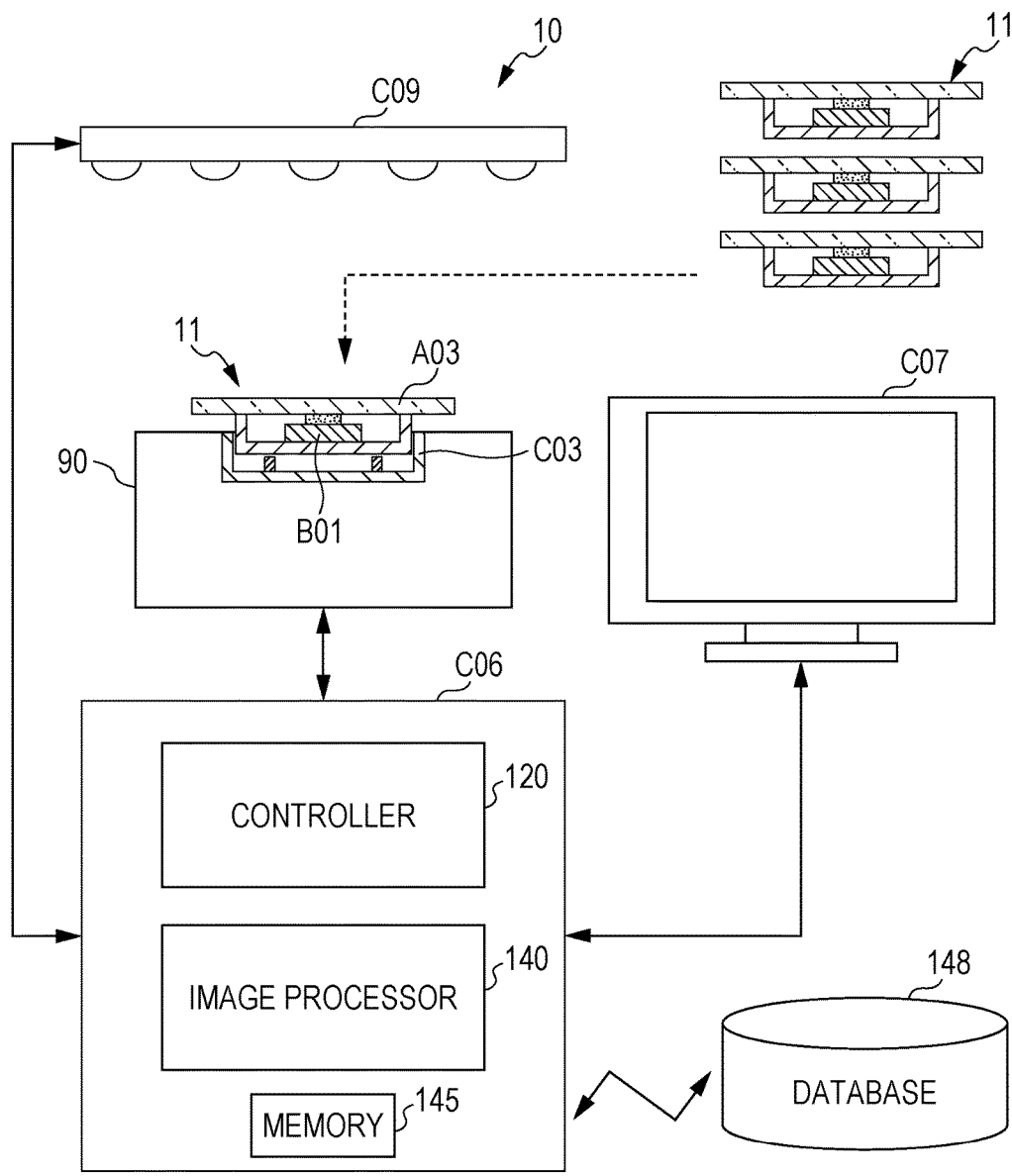
FIG. 8 illustrates an exemplary configuration of an image forming apparatus according to the first embodiment.

FIG. 8 schematically illustrates an exemplary configuration of an image forming apparatus 10 according to the present embodiment.

The image forming apparatus 10 illustrated in FIG. 8 includes an illumination system C09. The illumination system C09 causes light to be incident on the image sensor B01 through the slide A03 provided in the prepared specimen 11, which is loaded on the socket C03. The configuration and the operation of the illumination system C09 are described later. In the example illustrated in FIG. 8, the illumination system C09 is located above the prepared specimen 11 that is supported by an imager 90. The embodiment of the present disclosure, however, is not limited to such an example. The vertical relationship between the illumination system C09 and the prepared specimen 11 may be reversed, or a line connecting the illumination system C09 and the prepared specimen 11 may be at an angle relative to the vertical direction.

In the example illustrated in FIG. 8, the image forming apparatus 10 includes a control device (computer) C06. The computer C06 may be circuitry, such as a processor, mounted in a device or may be an independent device. In other words, the computer C06 may be a device that is separate from the imager 90 and/or the illumination system C09. In the exemplary configuration illustrated in FIG. 8, the computer C06 includes a controller 120, an image processor 140, and a memory 145. The controller 120 is configured to control the image sensor B01 in the prepared specimen 11, which is loaded on the socket C03, and the illumination system C09, and to thus cause the image sensor B01 to capture an image of a stained slice in the prepared specimen 11.

As described with reference to FIG. 7, the package 12 becomes electrically connected to the socket C03, upon being located on the socket C03. The socket C03 is connected to the computer C06 illustrated in FIG. 8 through the circuit board C05 illustrated in FIG. 7.

Image data obtained through imaging is subjected to combining and pixel interpolation processing by the image processor 140. Through such processing, a higher-resolution image of the stained slice is generated. The generated image, for example, may be displayed in a display C07 and stored in the memory 145 or a database 148.

Figure 9:
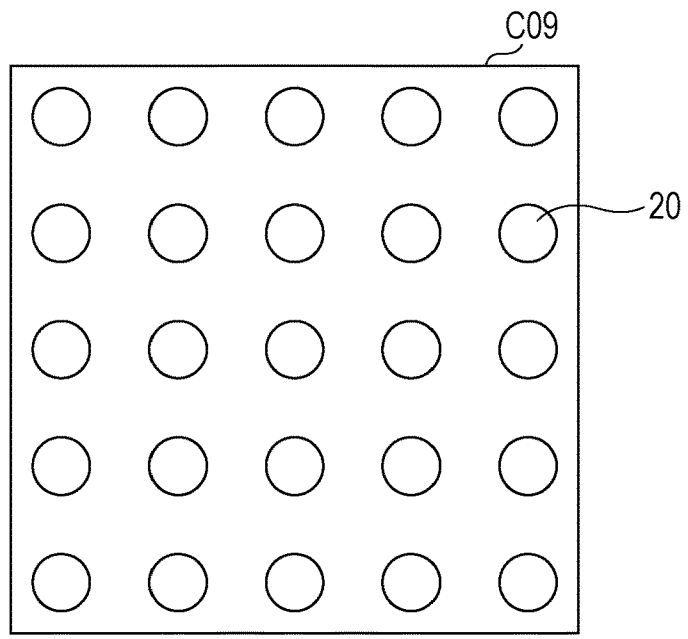
FIG. 9 is a plan view illustrating an example of an illumination system provided in the image forming apparatus according to the first embodiment.

FIG. 9 is a plan view schematically illustrating an exemplary arrangement of light source elements in the illumination system C09, which can be used in the embodiments of the present disclosure. In the example illustrated in FIG. 9, 25 light source elements 20 are arrayed in a matrix. Here, the light source elements 20 are arrayed in a matrix of 5 by 5, which is provided on a light-emission surface of the illumination system C09.

Figure 10:
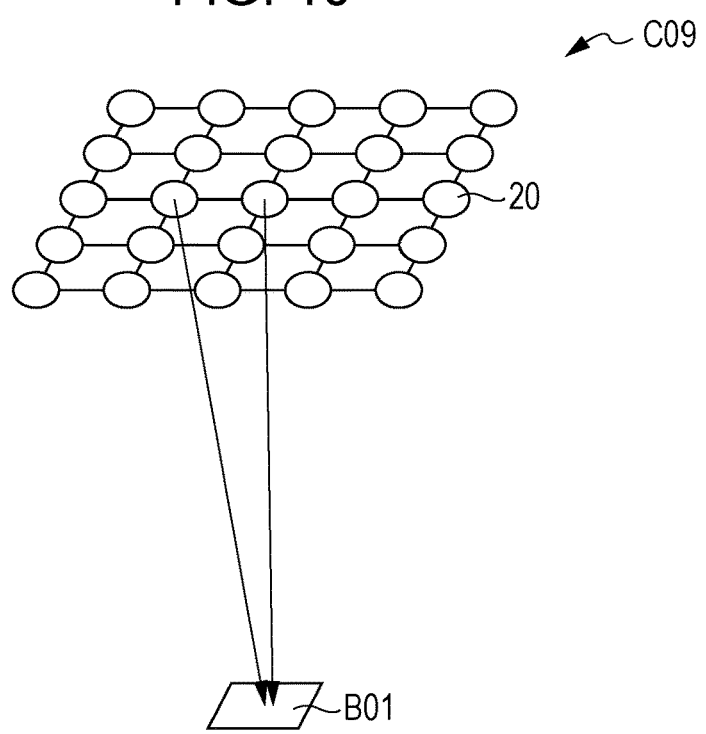
FIG. 10 is a perspective view illustrating a relationship between the illumination system illustrated in FIG. 9 and an image sensor.

As illustrated in FIG. 10, the illumination system C09 that includes the light source elements 20 arrayed in a matrix can cause illumination light to be incident on the image sensor B01 provided in the prepared specimen 11 at different angles. The illumination light emitted by the light source elements 20 is substantially parallel light at the image sensor B01. For example, when the illumination system C09 includes at least four light source elements 20, the illumination system C09 can cause the illumination light to be incident on the image sensor B01 provided in the prepared specimen 11 successively in at least four different directions. Each of the light source elements 20 in the illumination system C09 may be an element constituted by a combination of a light-emitting element, such as a light-emitting diode (LED), and a color filter. In addition, each of the light source elements 20 may be provided with an optical element, a reflection mirror, or the like for adjusting the divergence of the light rays.

Figure 11:
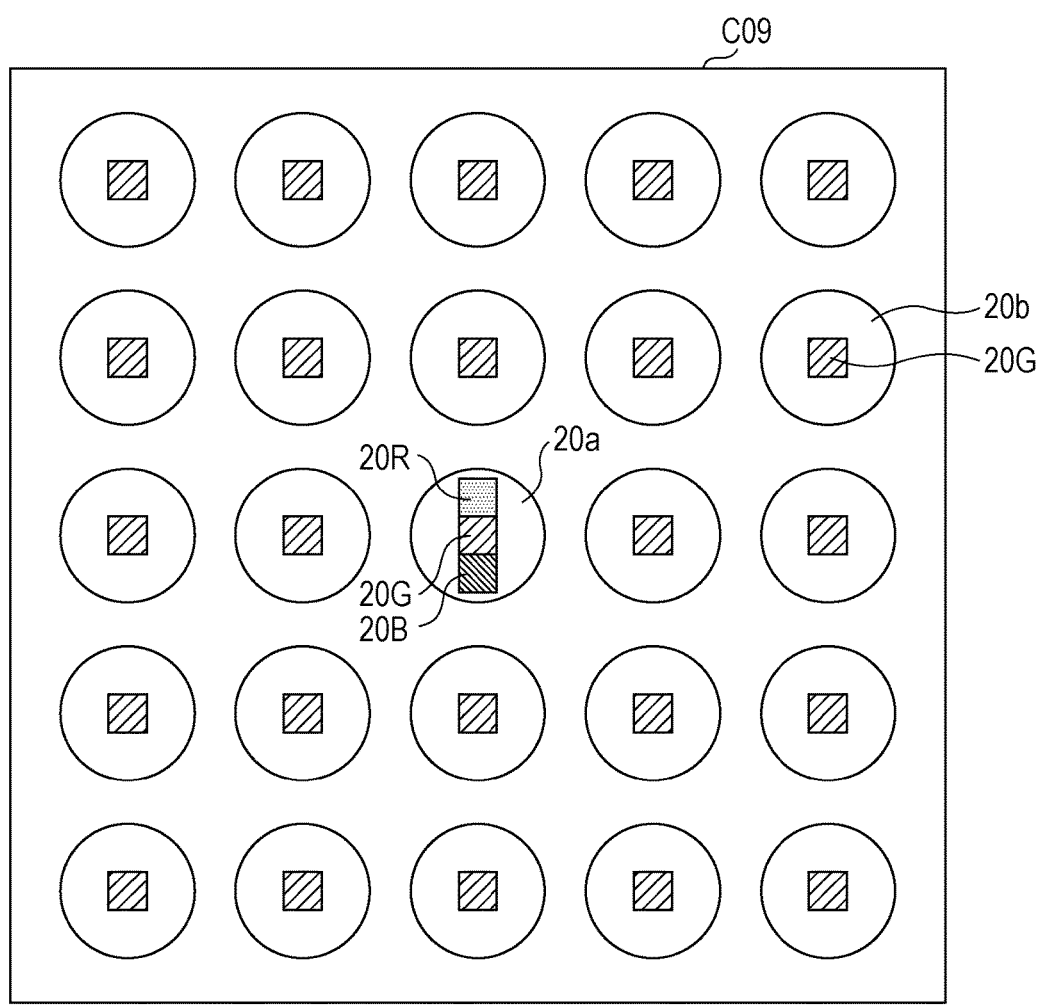
FIG. 11 is a plan view illustrating a detailed configuration of the illumination system illustrated in FIG. 9.

In the present embodiment, as illustrated in FIG. 11, a light source element 20a located at the center of the light-emission surface of the illumination system C09 may be constituted by three LED chips 20G, 20R, and 20B that have peaks in mutually different wavelength ranges. The three LED chips 20G, 20R, and 20B are configured to emit, respectively, a first light having a peak in a first wavelength range, a second light having a peak in a second wavelength range, and a third light having a peak in a third wavelength range. In the present embodiment, the first light, the second light, and the third light are green light, red light, and blue light, respectively. The light source element 20a does not need to be constituted by a plurality of LED chips, and may instead be constituted by a single white LED chip. In addition, the light source element 20a may be a discharge pipe or a laser element.

In the present embodiment, 24 light source elements 20b excluding the light source element 20a located at the center are configured to emit the first light, namely, the green light in this example. The light source elements 20b typically include the LED chips 20G.

The illumination system C09 configured as described above can illuminate a sample slice in the prepared specimen 11 loaded on the socket C03 with the illumination light emitted successively in 25 different illumination directions with the sample slice serving as a reference. The illumination system C09 can emit the first light (green light in this example) having a peak in the first wavelength range in 25 different illumination directions. In this example, the illumination system C09 is configured to emit the second light (red light in this example) having a peak in the second wavelength range and the third light (blue light in this example) having a peak in the third wavelength range in a single illumination direction.

Figure 12:
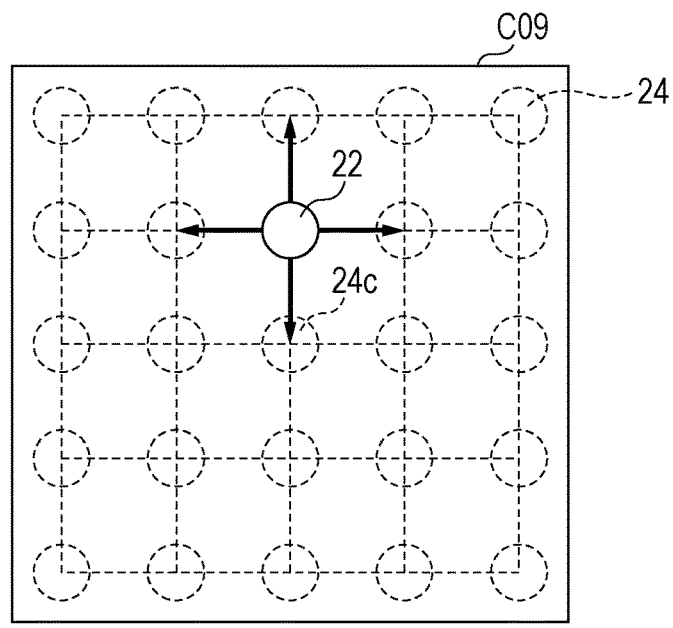
FIG. 12 is a plan view illustrating another example of the illumination system provided in the image forming apparatus according to the first embodiment.

FIG. 12 illustrates another exemplary configuration of the illumination system C09. In this example, a single light source element 22 moves so as to emit light at different light source positions 24. The movable light source element 22 can emit the first light (green light in this example) having a peak in the first wavelength range, the second light (red light in this example) having a peak in the second wavelength range, and the third light (blue light in this example) having a peak in the third wavelength range selectively or simultaneously. Such a light source element 22, for example, may have a configuration similar to the configuration of the light source element 20a located at the center of the illumination system C09 illustrated in FIG. 11.

Any desired mechanism can be employed to move the light source element 22. For example, the light source element 22 can be made to emit light at a desired position with the use of two stepping motors configured to move a movable portion in the directions of the X-axis and the Y-axis.

Figure 13:
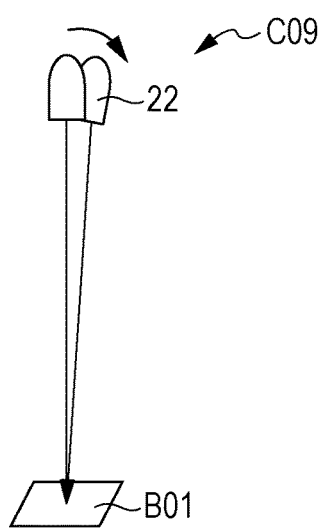
FIG. 13 is a perspective view illustrating a relationship between the illumination system illustrated in FIG. 12 and an image sensor.

As illustrated in FIG. 13, the illumination system C09 that includes the movable light source element 22 can cause the illumination light to be incident on the image sensor B01 in the prepared specimen 11 at different angles. The illumination light emitted by the light source element 22 is substantially parallel light at the image sensor B01. The light source element 22 may be an element constituted by a combination of a light-emitting element and a color filter. In addition, the light source element 22 may be provided with an optical element, a reflection mirror, or the like for adjusting the divergence of the light rays.

When the illumination system C09 illustrated in FIG. 12 is employed, the illumination system C09, for example, causes the illumination light of three different colors to be successively incident on the image sensor B01 from a light source position 24c located at the center of the illumination system C09. The illumination system C09 causes the illumination light of a single color to be incident on the image sensor B01 from the remaining light source positions 24.

The illumination system according to the present disclosure is not limited to the example described above. For example, the number of the light source elements and the arrangement pattern of the light source elements are not limited to the illustrated examples. An illumination system that includes a plurality of fixed light source elements, such as the one illustrated in FIG. 9, may include at least four light source elements.

The use of such an illumination system C09 makes it possible to implement the operations described hereinafter.

Figure 14A:
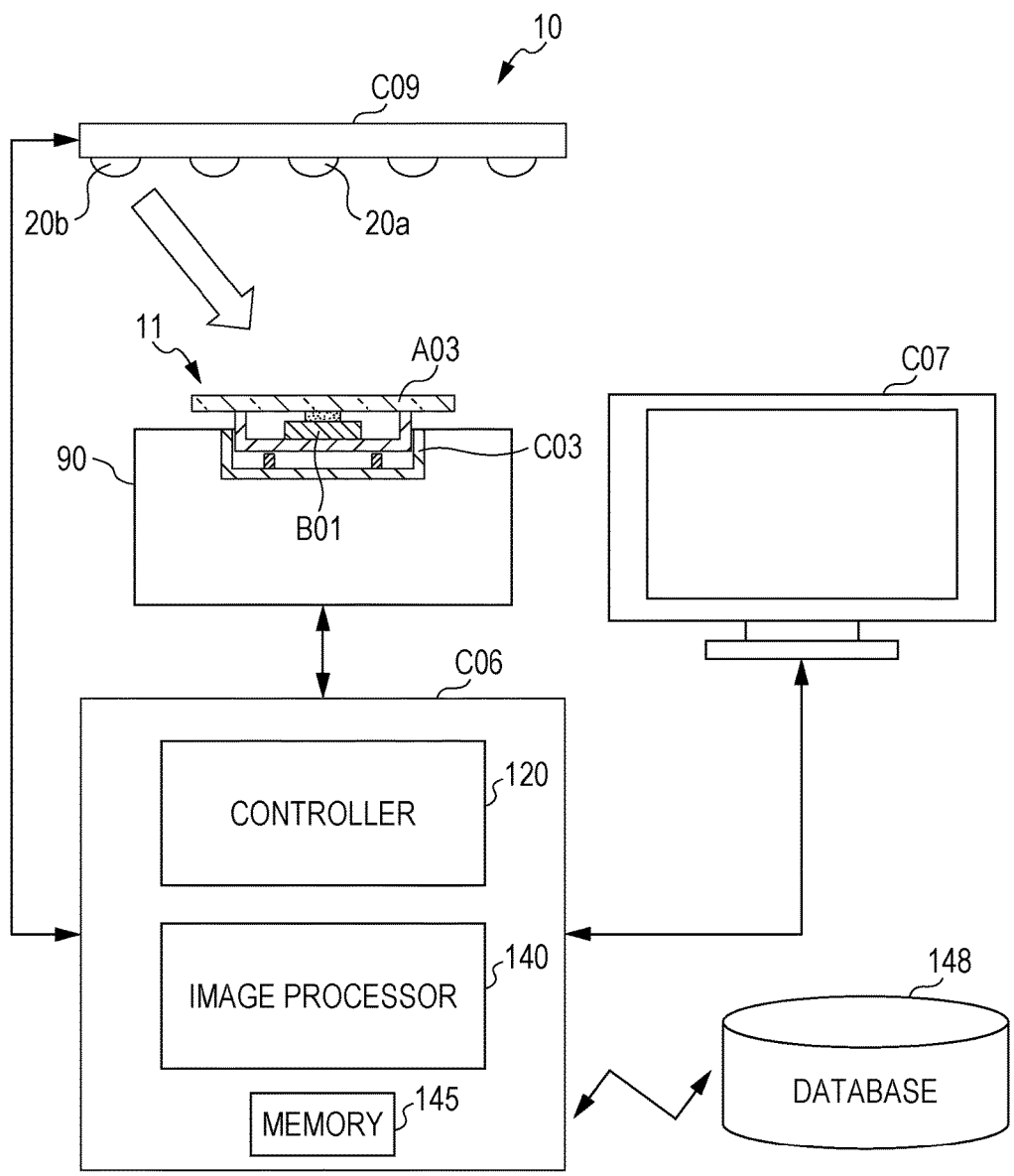
FIG. 14A illustrates an exemplary operation of the image forming apparatus according to the first embodiment.

First, with reference to FIG. 14A, the light source element 20b that is located at an initial light source position, among the 25 light source positions, emits the first light, and while the prepared specimen 11 is being illuminated with the first light, the image sensor B01 in the prepared specimen 11 captures an image of a sample slice. Data of the image (first-color image) obtained through the imaging is read out by the imager 90 from the image sensor B01 and is transmitted to the controlling computer C06. This operation for obtaining data of the first-color image is repeated while changing the position of the light source element that emits light.

Figure 14B:
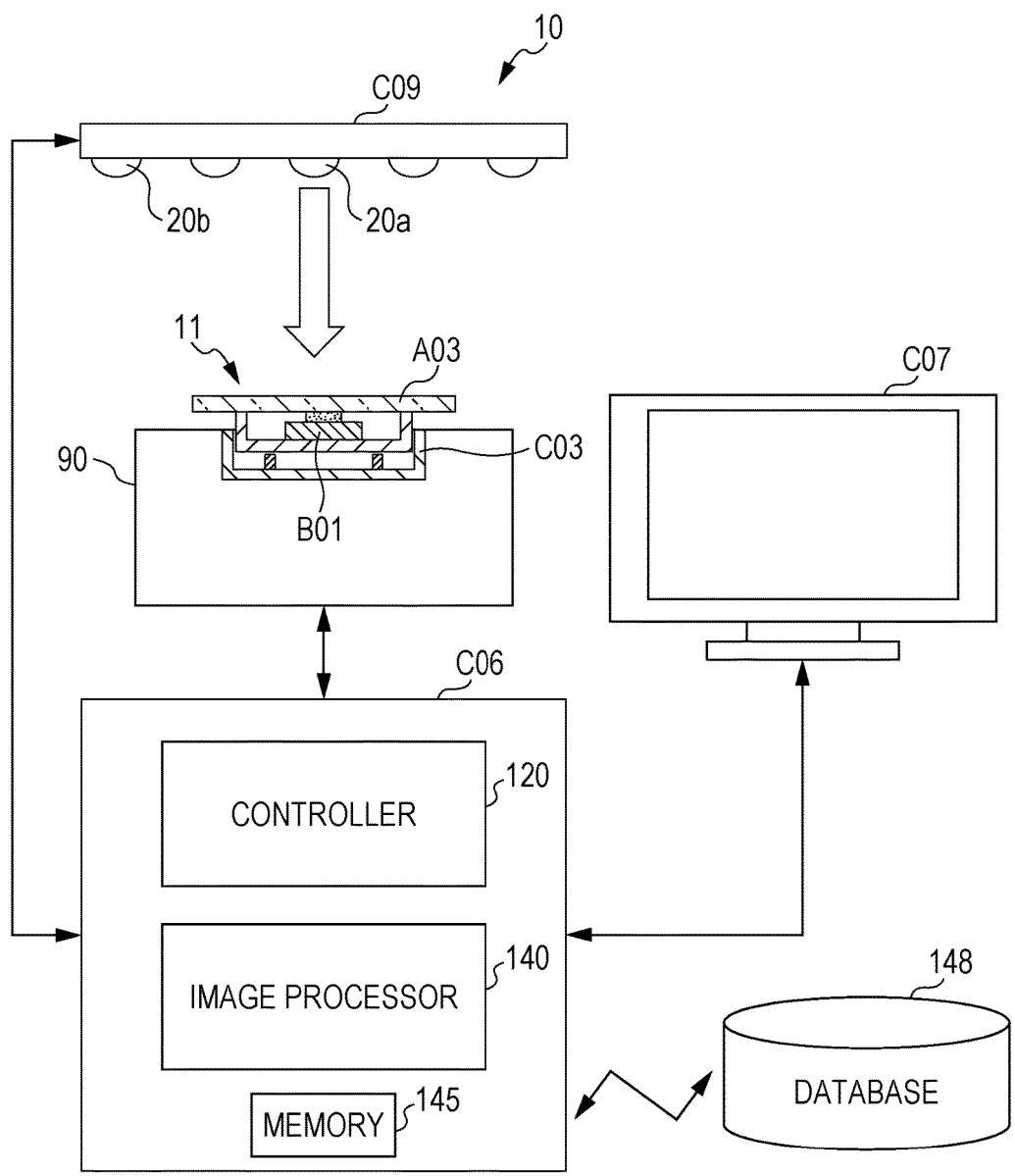
FIG. 14B illustrates the exemplary operation of the image forming apparatus according to the first embodiment.
Figure 14C:
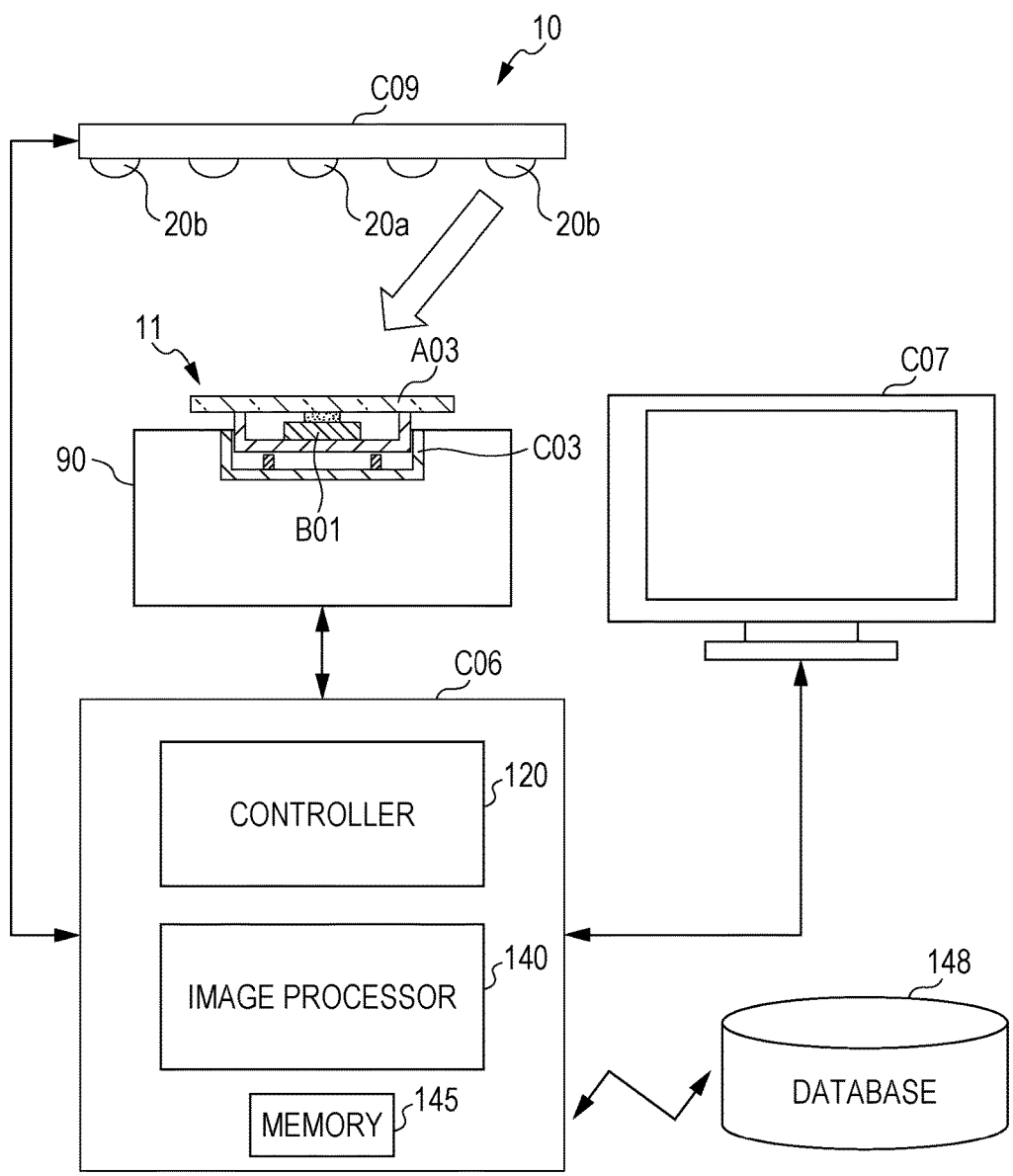
FIG. 14C illustrates the exemplary operation of the image forming apparatus according to the first embodiment.

Subsequently, with reference to FIG. 14B, in this example, the light source element 20a located at the center of the 25 light source positions emits the first light, and while the prepared specimen 11 is being illuminated with the first light, the image sensor B01 in the prepared specimen 11 captures an image of the sample slice. Data of the image (first-color image) obtained through the imaging is read out by the imager 90 from the image sensor B01 and is transmitted to the controlling computer C06. In addition, the light source element 20a emits the second light, and while the prepared specimen 11 is being illuminated with the second light, the image sensor B01 in the prepared specimen 11 captures an image of the sample slice. Data of the image (second-color image) obtained through the imaging is read out by the imager 90 from the image sensor B01 and is transmitted to the controlling computer C06. Furthermore, the light source element 20a emits the third light, and while the prepared specimen 11 is being illuminated with the third light, the image sensor B01 in the prepared specimen 11 captures an image of the sample slice. Data of the image (third-color image) obtained through the imaging is read out by the imager 90 from the image sensor B01 and is transmitted to the controlling computer C06.

Subsequently, with reference to FIG. 14O, the light source element 20b located at a final light source position, among the 25 light source positions, emits the first light, and while the prepared specimen 11 is being illuminated with the first light, the image sensor B01 in the prepared specimen 11 captures an image of the sample slice. As described above, data of the image (first-color image) obtained through the imaging is read out by the imager 90 from the image sensor B01 and is transmitted to the controlling computer C06.

The order in which the light source elements 20 emit light is not fixed. The light source element 20a located at the center may first emit light, and a first-color image, a second-color image, and a third-color image may be obtained. It is not necessary to obtain a second-color image and a third-color image successively after a first-color image is obtained while the light source element 20a located at the center is emitting light. In addition, the position of the light source element 20a that emits light of the three colors does not need to fall at the center of the illumination system C09, or the number of the light source elements that emit light of the three colors is not limited to one.

Figure 15A:
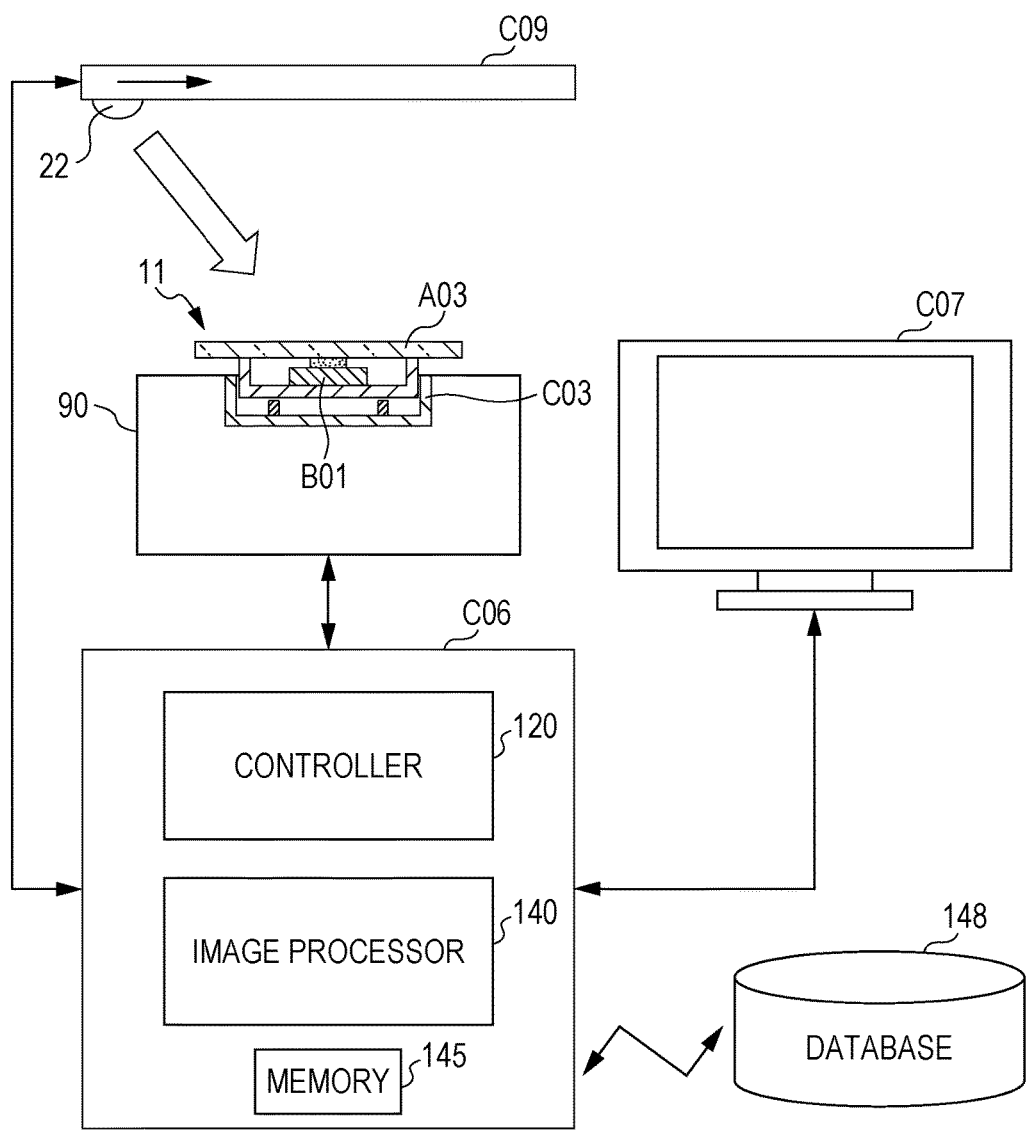
FIG. 15A illustrates another exemplary operation of the image forming apparatus according to the first embodiment.
Figure 15B:
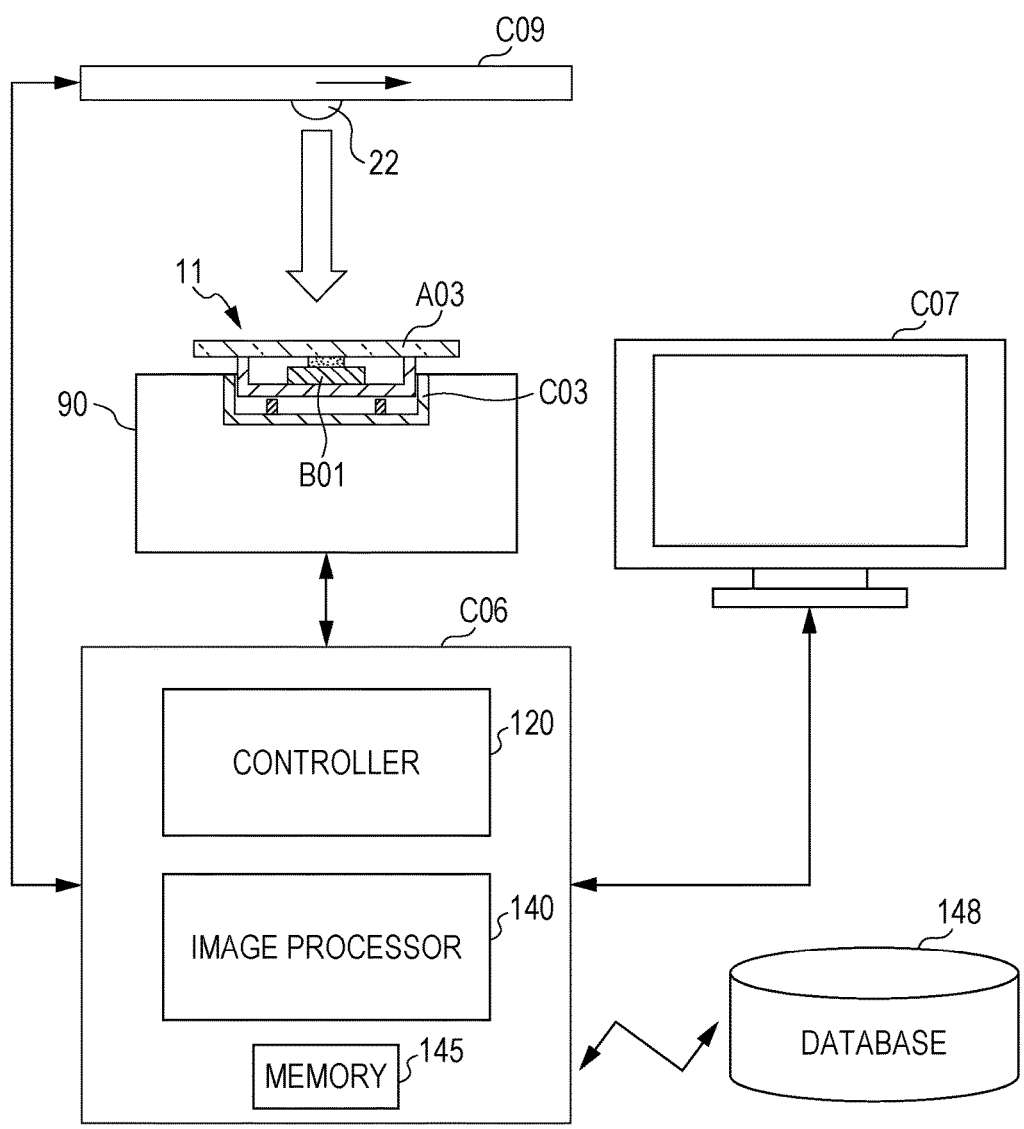
FIG. 15B illustrates the other exemplary operation of the image forming apparatus according to the first embodiment.

Subsequently, with reference to FIGS. 15A and 15B, an embodiment in which one or more light source elements are movably supported is described.

In this embodiment, the light source element 22 is moved to multiple light source positions, and the prepared specimen 11 is illuminated with the illumination light successively from the respective light source positions. If the exposure time necessary for imaging is sufficiently short, the light source element 22 does not need to be paused, and the imaging may be carried out while the light source element 22 is being moved. In this embodiment, for example, upon the light source element 22 reaching right above the prepared specimen 11, the light source element 22 illuminates a subject in the prepared specimen 11 successively with the first light through the third light having mutually different wavelengths, and images of the subject are captured. In this case, it is preferable that the light source element 22 be paused right above the prepared specimen 11.

Subsequently, the image forming apparatus and the image forming method according to an embodiment of the present disclosure are described in further detail.

Figure 16A:
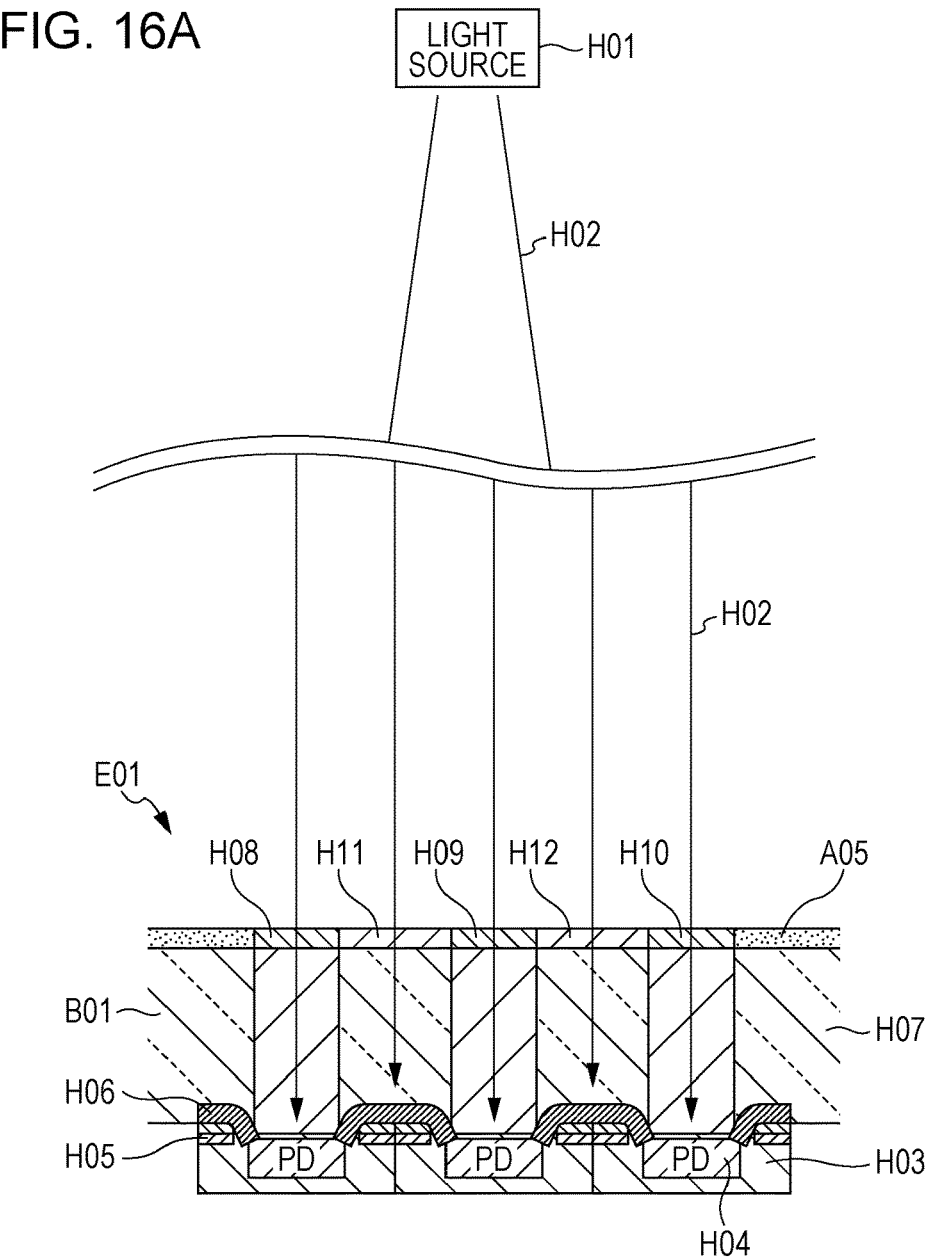
FIG. 16A is a sectional view schematically illustrating an operation of capturing, with an image sensor, an image of a subject that is being illuminated with illumination light at a given angle, according to the first embodiment.

FIG. 16A is an illustration for describing a method for capturing a biological image at a magnification of ×2 while changing the illumination angle of the illumination light. FIG. 16A illustrates a state in which the stained slice is illuminated with the illumination light from the right above the stained slice.

A light source H01 illuminates a prepared specimen E01 of the CIS method with illumination light H02 from the right above the prepared specimen E01. The light source H01 is disposed at a location that is sufficiently spaced apart from the prepared specimen E01 with respect to the size of the prepared specimen 11. Thus, the illumination light H02 can be regarded as parallel light. An optical system that collimates the light emitted by the light source to produce parallel light may be disposed in an optical path. In that case, the light source can be disposed closer to the prepared specimen E01.

The image sensor B01 illustrated in FIG. 16A includes a semiconductor substrate H03, photodiodes H04, a wiring layer H05, light-blocking layers H06 that cover the wiring layer H05, a transparent layer H07 that covers a side of the semiconductor substrate H03 on which light is incident. Portions of the illumination light H02 that have passed through a stained slice A05 and are incident on the photodiodes H04 are subjected to photoelectric conversion by the photodiodes H04 so as to generate electric charges that constitute an image signal. The configuration of the image sensor B01 is not limited to the example illustrated in FIG. 16A.

Figure 16B:
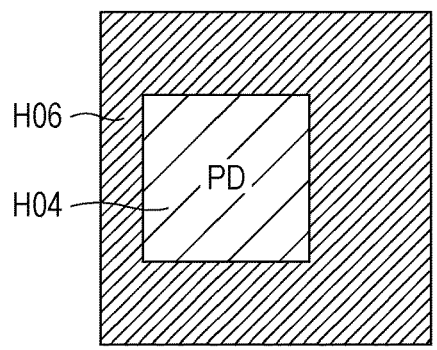
FIG. 16B is a plan view illustrating an exemplary ratio of the area of a photodiode (PD) to the area of a pixel.

FIG. 16B is a plan view illustrating a pixel region in the image sensor B01. As illustrated in FIG. 16B the area of a photodiode (PD) included in a pixel region is smaller than the area of the pixel region. Here, the area of a pixel region is determined by a product of the pixel pitch in the horizontal direction and the pixel pitch in the vertical direction. In this example, the ratio (numerical aperture) of the area of the photodiode (PD) to the area of the pixel region is approximately 25%. The imaging surface of the image sensor B01 is covered with the light-blocking layers H06 except in regions where the photodiodes (PD) are provided. In this example, the image sensor B01 does not include a microlens array that is for increasing the numerical aperture. According to the embodiment of the present disclosure, as the numerical aperture is smaller, a higher resolution can be achieved.

In the illumination state illustrated in FIG. 16A, light that has passed through a region H08, a region H09, and a region H10 of the stained slice A05 is incident on the corresponding photodiodes H04. The signal level of the photodiode H04 located right below the region H08 is determined by the density of the region H08. In a similar manner, the signal level of the photodiode H04 located right below the region H09 is determined by the density of the region H09, and the signal level of the photodiode H04 located right below the region H10 is determined by the density of the region H10. The density of a region in the present specification refers to the optical density (OC) of a region in a stained slice. Thus, the magnitudes of the signal charges generated by the three photodiodes H04 illustrated in FIG. 16A correspond to the optical transmittances of the region H08, the region H09, and the region H10.

Meanwhile, a portion of the illumination light that is incident on the light-blocking layer H06 is irrelevant to the photoelectric conversion by the photodiodes H04. Therefore, a portion of the light that has passed through the stained slice A05 and is incident on the light-blocking layer H06 is not reflected on an image signal outputted by the image sensor B01. In the example illustrated in FIG. 16A, light that has passed through either of a region H11 and a region H12 is not reflected on the image signal.

Figure 17A:
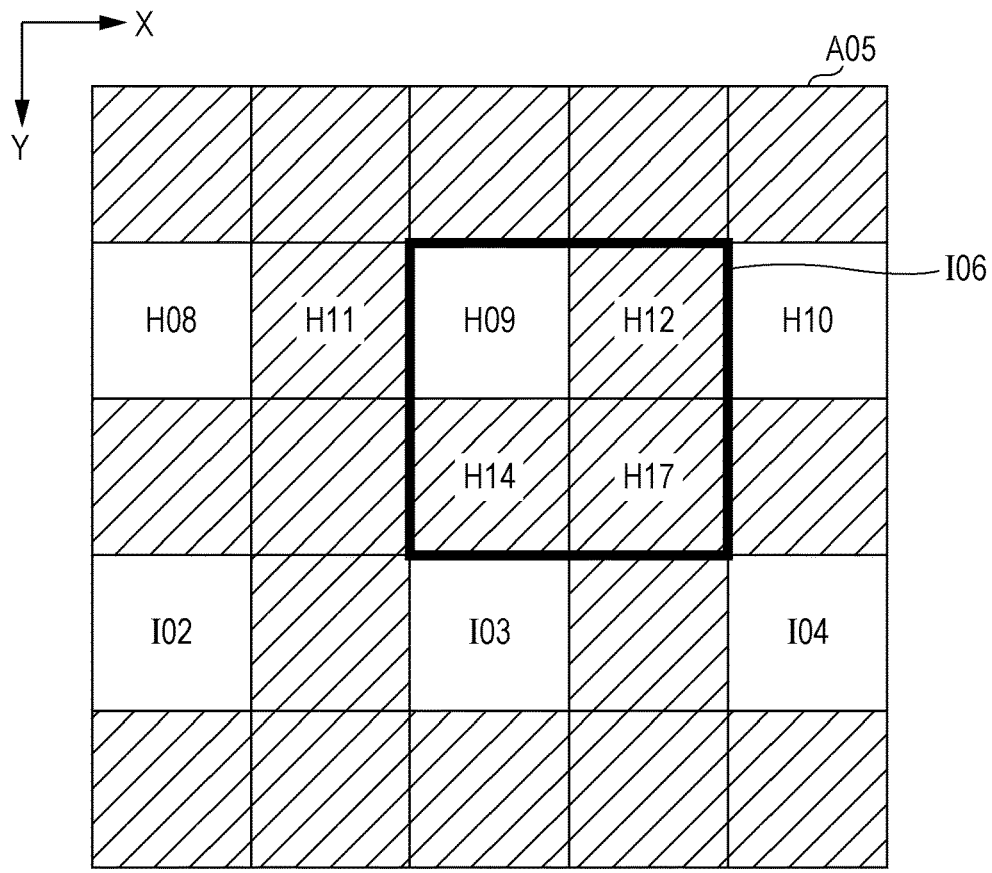
FIG. 17A is a plan view schematically illustrating an arrangement of pixels in the image obtained through the operation illustrated in FIG. 16A.

In the example illustrated in FIG. 16A, the width of the photodiode H04 along a section parallel to the paper plane is equal to the width of the light-blocking layer H06. Here, the image sensor B01 is a planar area sensor in which the photodiodes H04 are arrayed in a matrix on a two-dimensional plane. Therefore, as illustrated in FIG. 17A, regions of the stained slice A05 through which the illumination light passes to be incident on the photodiodes H04 are discretely located in the row and column directions. As illustrated in FIG. 16A, the region H08, the region H09, and the region H10 are located right above the photodiodes H04. Therefore, the densities of these regions determine the signal levels of the corresponding photodiodes H04, which are then detected by the image sensor B01 in the form of the pixel values in a biological image. In this case, the region H11 and the region H12 are located right above the light-blocking layers H06, and thus light that has passed through either of the region H11 and the region H12 is not reflected on the pixel values in the biological image.

Figure 17B:
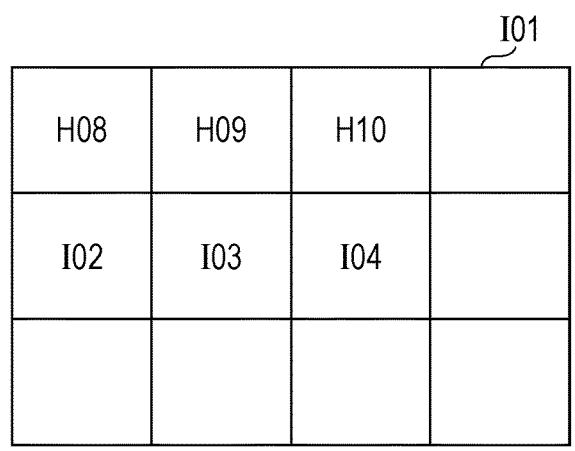
FIG. 17B schematically illustrates a biological image obtained in the illumination state illustrated in FIG. 16A.

What has been described about the region H08, the region H09, and the region H10 also applies to a region I02, a region I03, and a region I04. A biological image 101 (see FIG. 17B) captured while light source H01 emits light is an image that is formed by the pixel values that indicate the densities or the optical transmittances of the region H08, the region H09, the region H10, the region I02, the region I03, and the region I04.

Now, an attention is paid to a pixel I06 illustrated in FIG. 17A. A portion of the illumination light H02 that has passed through the region H09, among the region H09, the region H12, a region H14, and a region H17, of the stained slice A05 is incident on the photodiode H04 within the pixel I06. In the pixel I06, light that has passed through any of the region H12, the region H14, and the region H17, which are located in the vicinity of the region H09, is blocked by the light-blocking layers H06. As the image sensor B01 includes the light-blocking layers H06, it becomes possible to capture an image of a region (sub-pixel region) having a size that is one-fourth the size of the pixel I06.

In the present embodiment, a G-light source that emits G-color light (typically, green light), a B-light source that emits B-color light (typically, blue light), and an R-light source that emits R-color light (typically, red light) are disposed at the position of the light source H01. Therefore, the light source H01 can illuminate the subject successively with the G-color light, the B-color light, and the R-color light, serving as the illumination light H02, in the illumination direction illustrated in FIG. 16A. Thus, images are captured while the subject is being illuminated with the illumination light H02 of the respective colors, and three images (G image, B image, and R image) are obtained.

Figure 18:
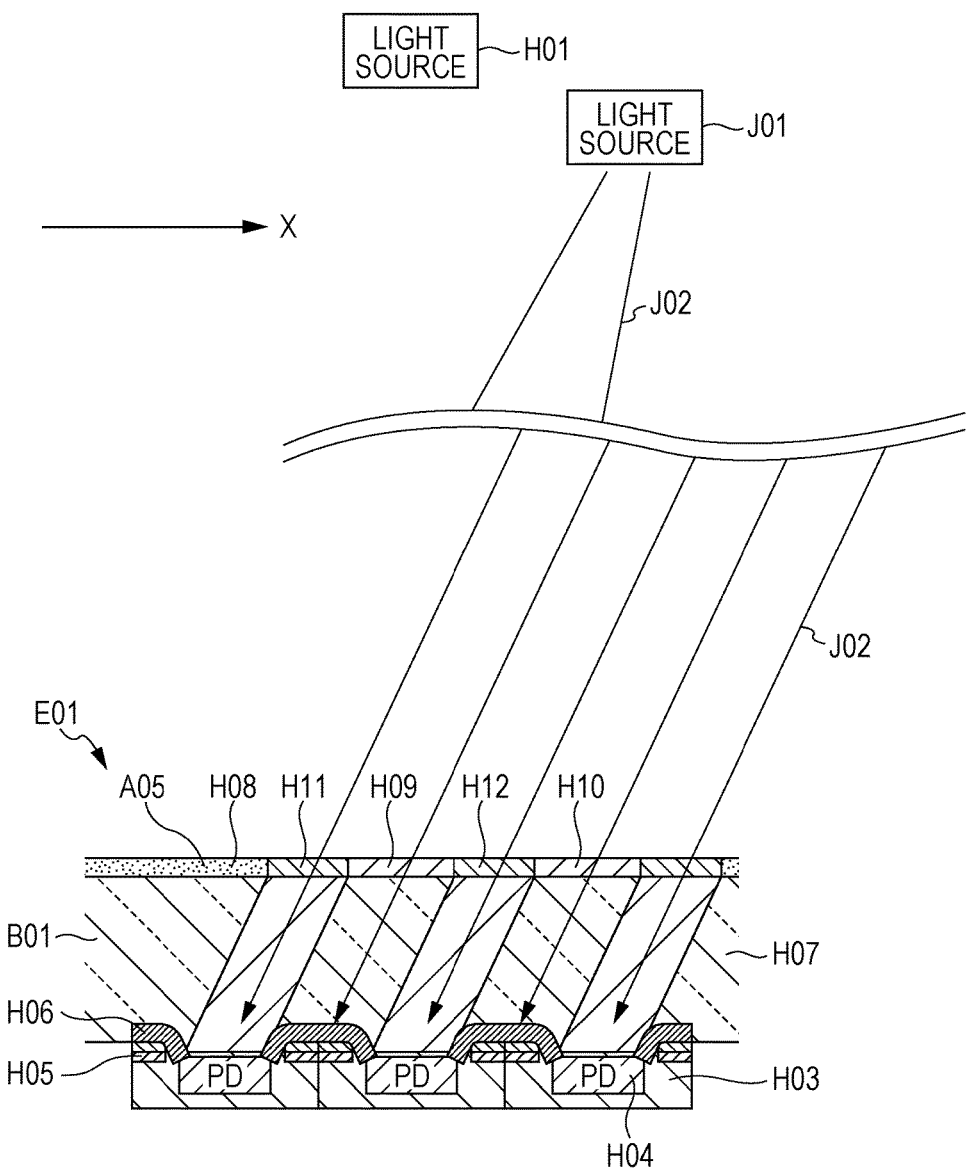
FIG. 18 is a sectional view schematically illustrating an operation of capturing, with an image sensor, an image of a subject that is being illuminated with illumination light at another angle, according to the first embodiment.

FIG. 18 illustrates a state in which the prepared specimen E01 of the CIS method is illuminated with illumination light in an illumination direction different from the illumination direction illustrated in FIG. 16A and a biological image is captured. In the example illustrated in FIG. 18, illumination light J02 emitted by a light source J01 is incident on the stained slice A05 at an angle from an upper right side of the stained slice A05. The light source J01 is disposed at a location that is sufficiently spaced apart from the prepared specimen E01 of the CIS method with respect to the size of the prepared specimen 11, and thus the illumination light J02 can be regarded as parallel light. The light source J01 according to the present embodiment is a G-light source that emits G-color light. In the description to follow (FIGS. 18, 20, 22), the illumination light with which the subject is illuminated in an illumination direction different from the illumination direction illustrated in FIG. 16A is G-color light.

In the illumination state illustrated in FIG. 18, light that has passed through the region H11 and the region H12 of the stained slice A05 is incident on the corresponding photodiodes H04. The density of the region H11 determines the signal level of the photodiode H04 located underneath the left side of the region H11 in FIG. 18. In a similar manner, the density of the region H12 determines the signal level of the photodiode H04 located underneath the left side of the region H12 in FIG. 18. In other words, the signal charges generated by the respective photodiodes H04 located to the left in FIG. 18 correspond to the optical transmittances of the region H11 and the region H12.

Meanwhile, a portion of the illumination light that is incident on the light-blocking layer H06 is irrelevant to the photoelectric conversion by the photodiodes H04, and is thus not reflected on the image signal outputted from the image sensor B01. In the illumination state illustrated in FIG. 18, portions of the illumination light that have passed through the region H08, the region H09, and the region H10 are not reflected on the image signal.

Figure 19A:
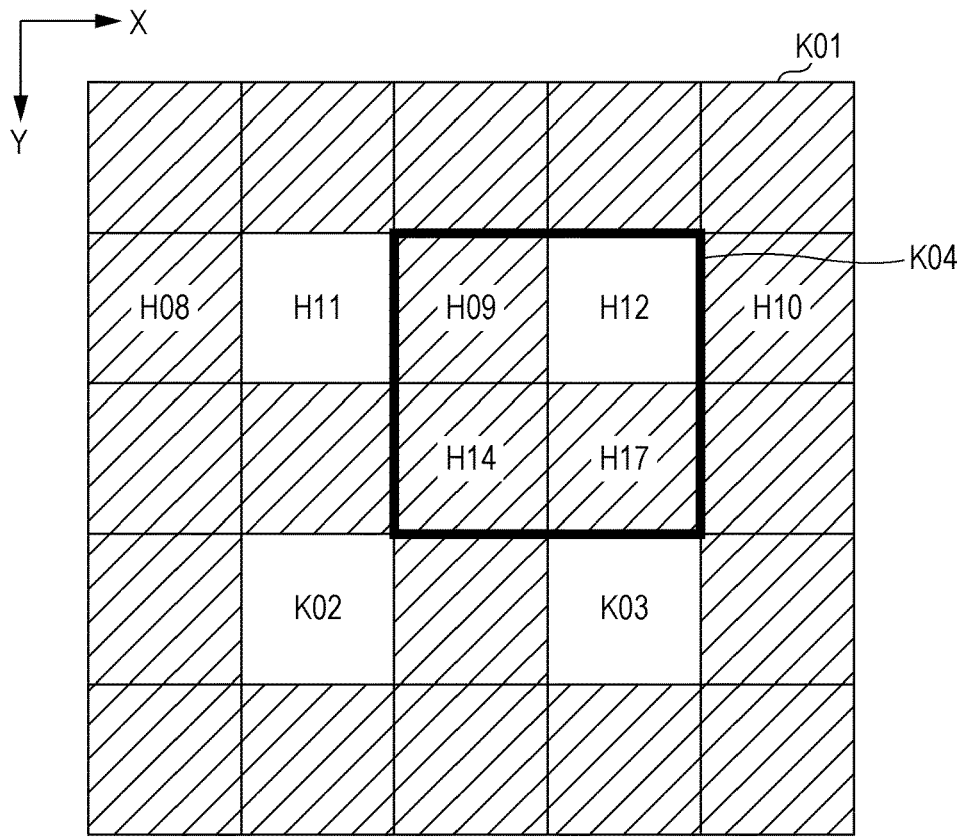
FIG. 19A is a plan view schematically illustrating an arrangement of pixels in the image obtained through the operation illustrated in FIG. 18.
Figure 19B:
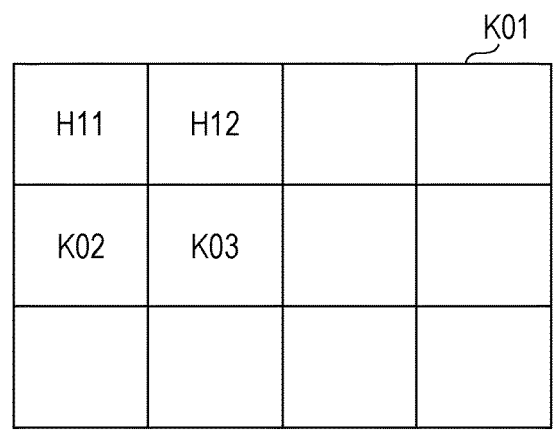
FIG. 19B schematically illustrates a biological image obtained in the illumination state illustrated in FIG. 18.

Among the regions illustrated in FIG. 19A, regions through which light that is incident on the photodiodes H04 passes are the regions H11 and H12 and regions K02 and K03, which are unconnected regions arrayed in the vertical and horizontal directions. In other words, when one sees a section orthogonal to the Y-axis in FIG. 19A, a photodiode H04 is located underneath the left side of each of the regions H11, H12, K02, and K03. Then, the densities of the respective regions determine the output levels of the photodiodes H04, and the output levels determine the pixel values in the biological image. Meanwhile, light that has passed through any of the region H08, the region H09, and the region H10 is incident on the light-blocking layer H06, and is thus not reflected on the pixel values in the biological image. Therefore, a biological image K01 (see FIG. 19B) captured while the light source J01 is emitting light is an image formed by the pixel values corresponding to the densities or the optical transmittances of the region H11, the region H12, the region K02, and the region K03.

An attention is paid to a pixel K04 illustrated in FIG. 19A. In the pixel K04, a portion of the illumination light J02 that has passed through the region H12 is incident on the photodiode H04. Portions of the illumination light J02 that have passed through the region H09, the region H17, and the region H14 included in the pixel K04 are all blocked by the light-blocking layers H06. As the image sensor B01 includes the light-blocking layers H06, it becomes possible to capture an image of a region having a size that is one-fourth the size of the pixel.

Figure 20:
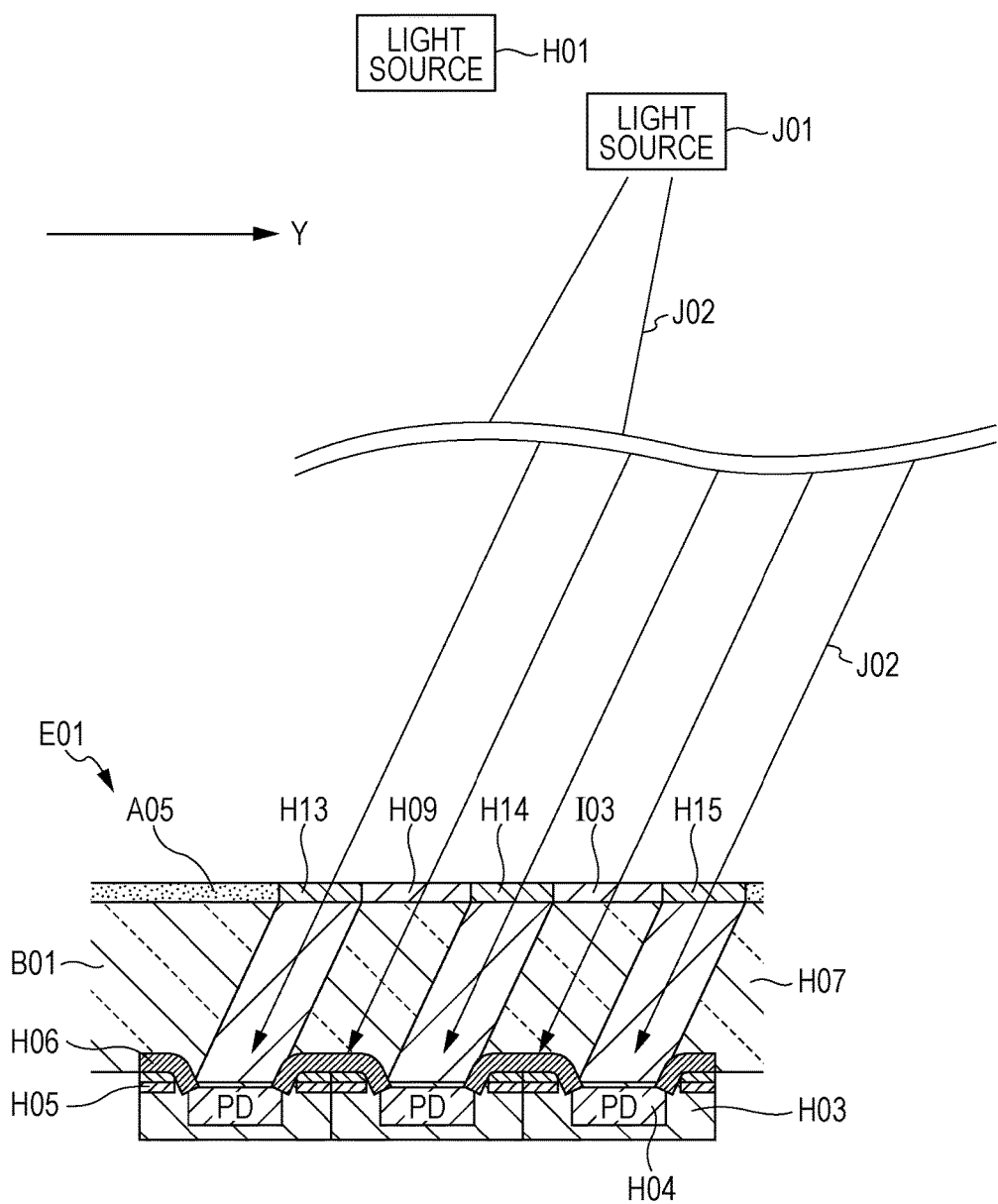
FIG. 20 is a sectional view schematically illustrating an operation of capturing, with an image sensor, an image of a subject that is being illuminated with illumination light at yet another angle, according to the first embodiment.

FIG. 20 illustrates a state in which the prepared specimen E01 of the CIS method is illuminated with illumination light in an illumination direction different from the illumination directions illustrated in FIGS. 16A and 18 and a biological image is captured. In the example illustrated in FIG. 20, the illumination light J02 emitted by the light source J01 that has been moved in the direction of the Y-axis is incident on the stained slice A05 at an angle from an upper right side of the stained slice A05. The light source J01 is disposed at a location that is sufficiently spaced apart from the prepared specimen E01 of the CIS method with respect to the size of the prepared specimen E01, and thus the illumination light J02 can be regarded as parallel light.

In the illumination state illustrated in FIG. 18, the light source is moved in the direction of the X-axis. Meanwhile, in the illumination state illustrated in FIG. 20, the light source is moved in the direction of the Y-axis. Thus, images of a region H13, the region H14, and a region H15 of the stained slice are captured. Portions of the illumination light J02 that have passed through the region H09 and the region I03 are incident on the light-blocking layers H06, and are thus not used in imaging.

Figure 21A:
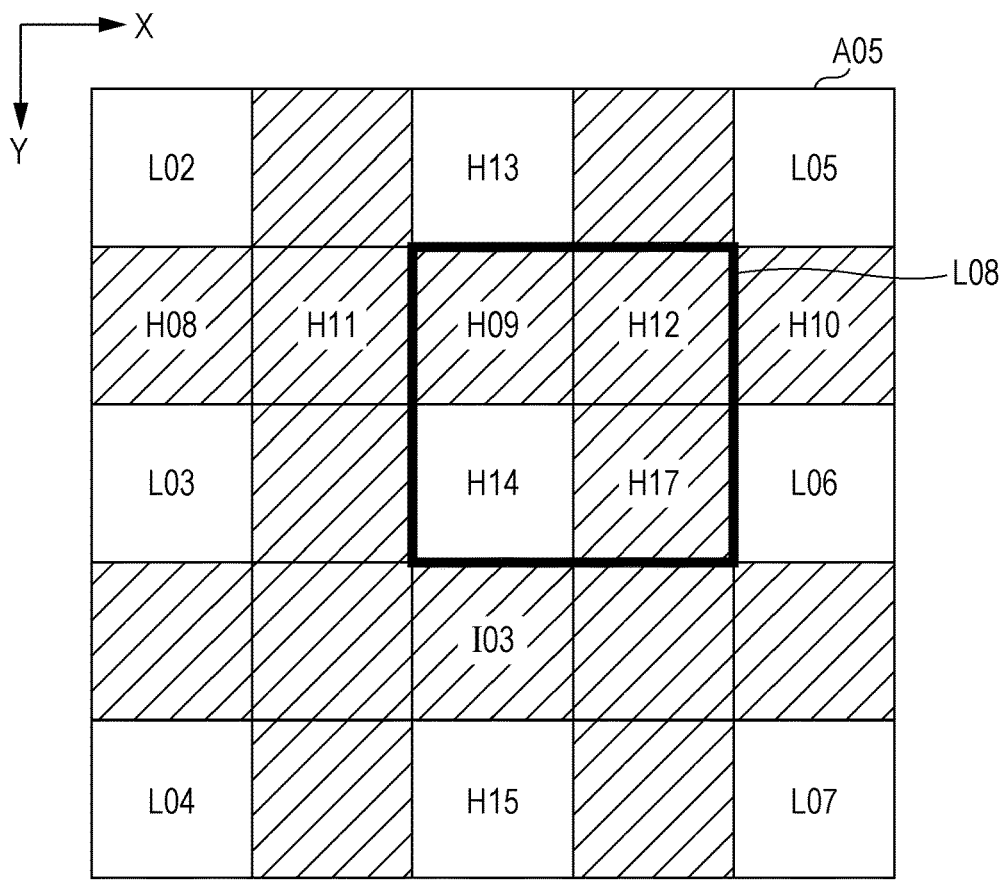
FIG. 21A is a plan view schematically illustrating an arrangement of pixels in the image obtained through the operation illustrated in FIG. 20.
Figure 21B:
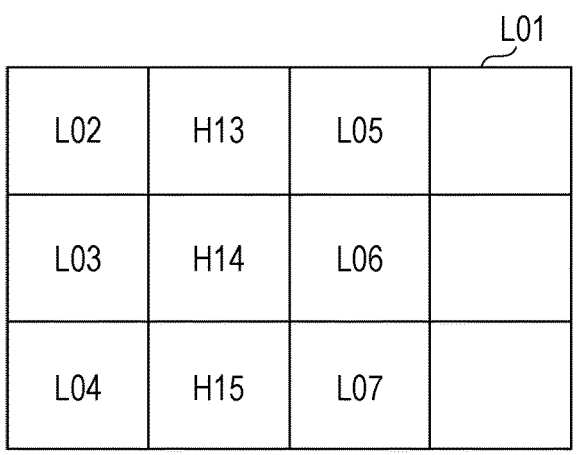
FIG. 21B schematically illustrates a biological image obtained in the illumination state illustrated in FIG. 20.

Among the regions illustrated in FIG. 21A, regions through which light that is incident on the photodiodes H04 has passed are regions L02, L03, and L04, the regions H13, H14, and H15, and regions L05, L06, and L07, which are unconnected regions arrayed in the vertical and horizontal directions. The densities of the aforementioned regions determine the output levels of the respective photodiodes H04, and form the pixel values in the biological image. Meanwhile, light that has passed through the region H08, H09, H10, H11, H12, or H17 is incident on the light-blocking layer H06, and is thus no reflected on the pixel values in the biological image. Therefore, a biological image L01 (see FIG. 21B) captured while the light source J01 is emitting light at the position illustrated in FIG. 20 is an image formed by the pixel values corresponding to the densities or the optical transmittances of the regions L02, L03, L04, H13, H14, H15, L05, L06, and L07.

When an attention is paid to a pixel L08 illustrated in FIG. 21A, a portion of the illumination light J02 that has passed through the region H14 is incident on the photodiode H04. Portions of the illumination light J02 that have passed through the region H09, the region H17, and the region H12 of the pixel L08 are blocked by the light-blocking layers H06. As the image sensor B01 includes the light-blocking layers H06, it becomes possible to capture an image of a region having a size that is one-fourth the size of the pixel.

Figure 22:
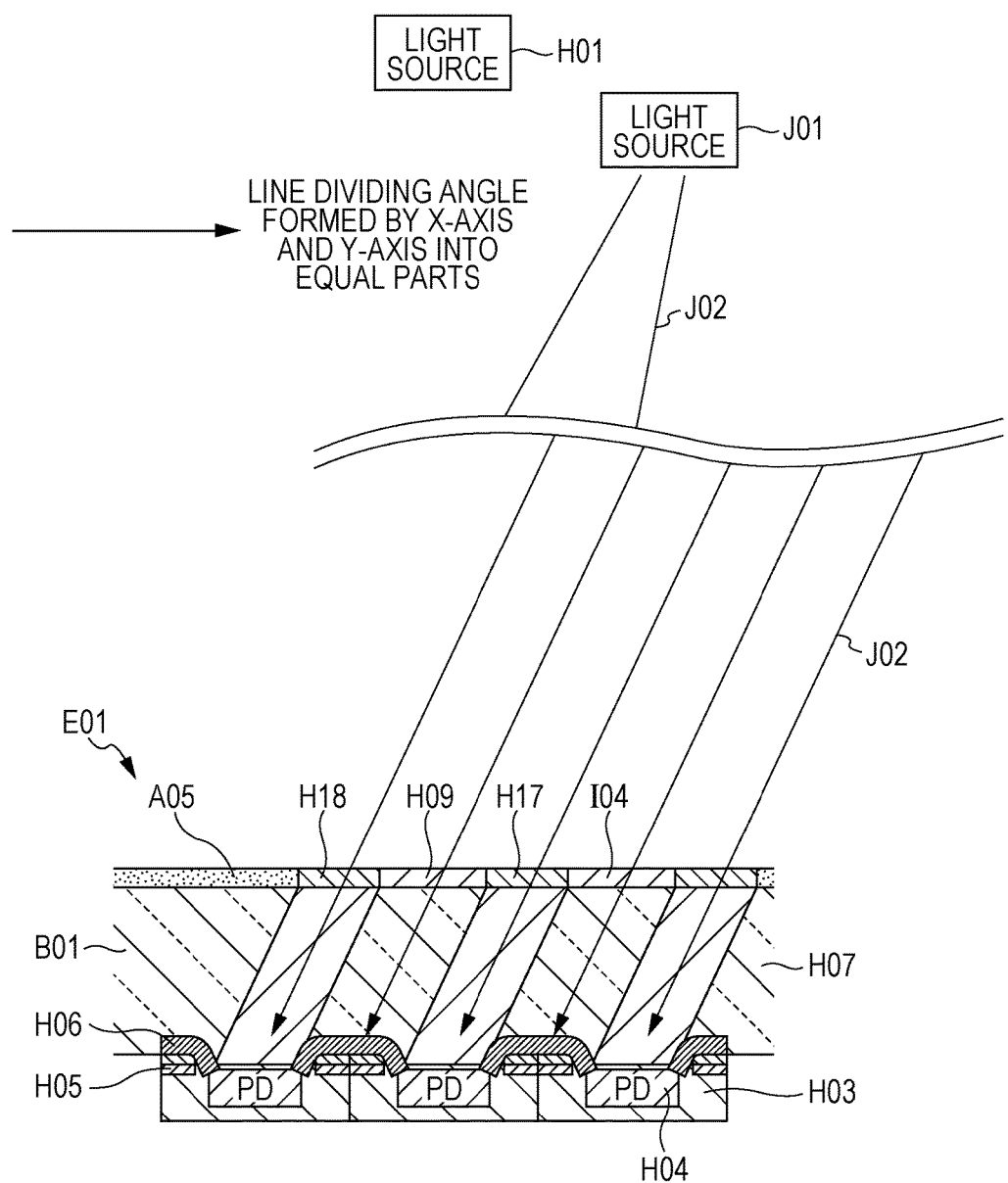
FIG. 22 is a sectional view schematically illustrating an operation of capturing, with an image sensor, an image of a subject that is being illuminated with illumination light at yet another angle, according to the first embodiment.

FIG. 22 illustrates a state in which the illumination light J02 emitted by the light source J01 that has been moved in the direction of a line dividing an angle formed by the X-axis and the Y-axis into equal parts (here, the direction of the bisectrix) from the position of the light source H01 is obliquely incident on the stained slice A05. As illustrated in FIG. 22, portions of the illumination light J02 that have passed through the region H17 and a region H18 are incident on the photodiodes H04. Meanwhile, portions of the illumination light J02 that have passed through the region H09 and the region I04 are blocked by the light-blocking layers H06.

Figure 23A:
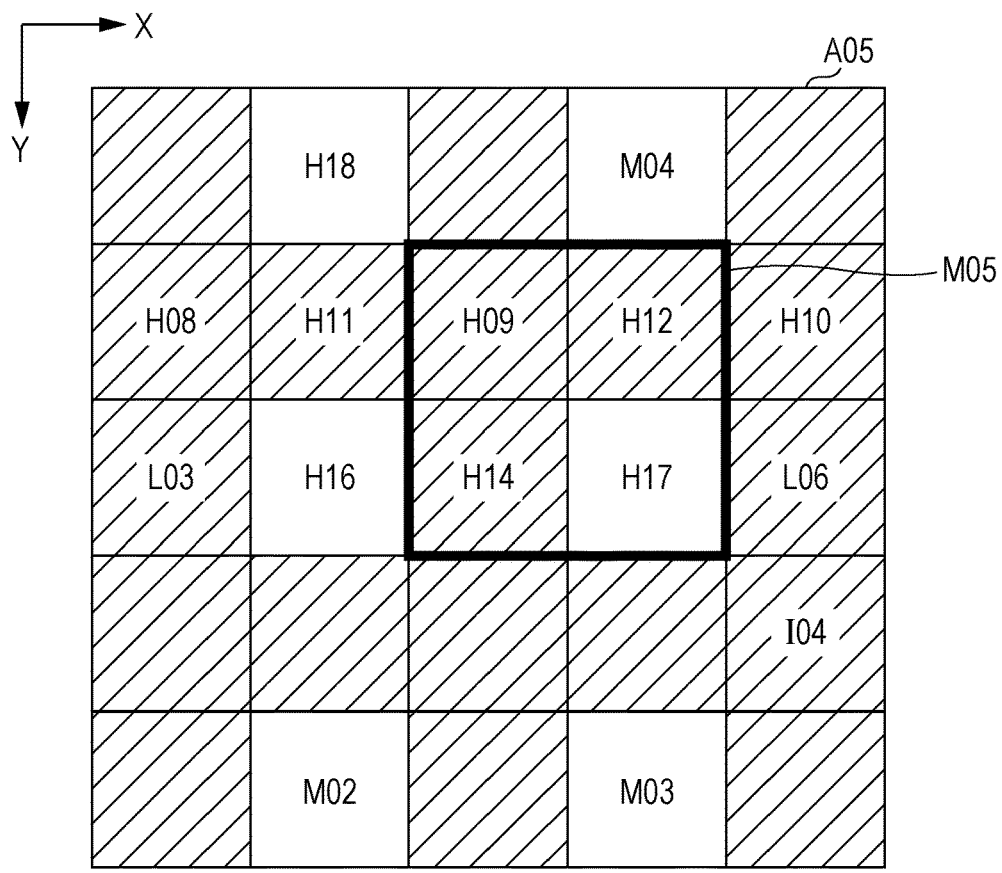
FIG. 23A is a plan view schematically illustrating an arrangement of pixels in the image obtained through the operation illustrated in FIG. 22.

Among the regions illustrated in FIG. 23A, regions through which light that is incident on the photodiodes H04 have passed through are a region H16, the regions H17 and H18, and regions M02, M03, and M04, which are unconnected regions arrayed in the vertical and horizontal directions. The densities of the aforementioned regions determine the output levels of the respective photodiodes H04, and form the pixel values in the biological image. Meanwhile, light that has passed through the region H08, H09, H10, H11, H12, L03, H14, L06, or I04 is incident on the light-blocking layer H06, and is thus not reflected on the pixel values in the biological image. Therefore, a biological image M01 (see FIG. 23B) captured while the light source J01 is emitting light at the position illustrated in FIG. 22 is an image formed by the pixel values corresponding to the densities or the optical transmittances of the regions H16, H17, H18, M02, M03, and M04.

When an attention is paid to a pixel M05 illustrated in FIG. 23A, a portion of the illumination light J02 that has passed through the region H17 is incident on the photodiode H04. Portions of the illumination light J02 that have passed through the region H09, the region H12, and the region H14 of the pixel M05 are blocked by the light-blocking layers H06. As the image sensor B01 includes the light-blocking layers H06, it becomes possible to capture an image of a region having a size smaller than the size of the pixel. Therefore, as the numerical aperture is smaller, a higher resolution can be achieved.

Through such procedures, the pixel values corresponding to the densities or the transmittances of the respective regions H09, H12, H14, and H17 included in the pixel K04 illustrated in FIG. 19A, for example, can be obtained. By combining multiple images obtained in illumination states with different illumination directions, a high-resolution image having a resolution that is higher than the resolution of each of the aforementioned images can be generated. In the embodiment of the present disclosure, multiple G images obtained while a subject is being illuminated with G-color light are subjected to the processing described above, and another G image having a resolution that is higher than the resolution of each of the aforementioned G images is generated. This high-resolution G image is combined with one or both of one or more R images obtained while the subject is being illuminated with R-color light and one or more B images obtained while the subject is being illuminated with B-color light, and thus a high-resolution color image (image that is not monochrome) can be formed.

Instead of varying the illumination angle of the illumination light by changing the position of the light source that emits light, the illumination angle of the illumination light may be varied by changing the angle and/or the position of the prepared specimen. Alternatively, the illumination angle of the illumination light may be varied by changing both the position of the light source that emits light and the angle of the prepared specimen.

Figure 24A:
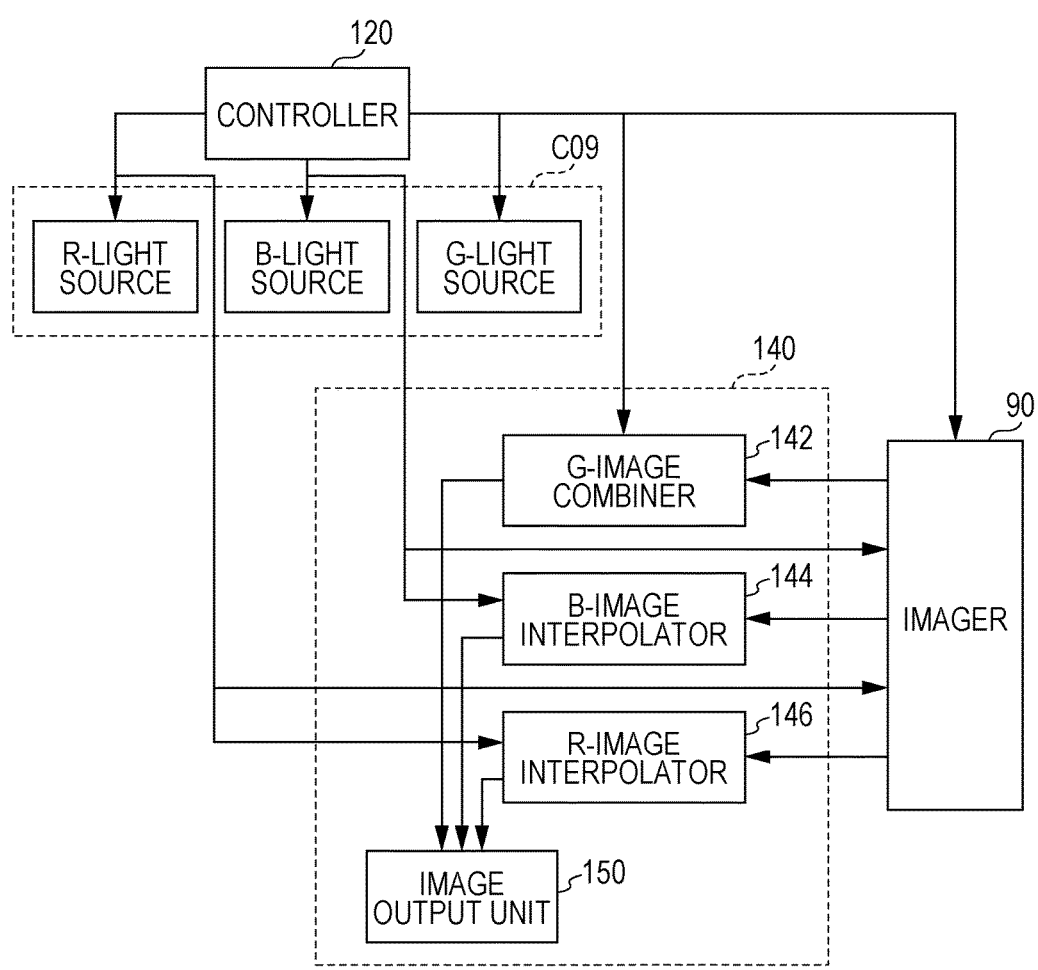
FIG. 24A is a block diagram schematically illustrating an exemplary configuration according to the first embodiment.

FIG. 24A is a block diagram illustrating an exemplary configuration of the controller and the image processor according to the present embodiment.

In the configuration illustrated in FIG. 24A, the imager 90 is electrically connected to an image sensor (not illustrated) that is disposed so that light that has passed through the sample slice is incident on the image sensor. This image sensor may be mounted on the prepared specimen as described above, or may be mounted on the imager 90.

The controller 120 is connected to the imager 90 and the illumination system C09, and controls the imager 90 and the illumination system C09. The illumination system C09 in the configuration illustrated in FIG. 24A includes a G-light source that emits C-color light, a B-light source that emits B-color light, and an R-light source that emits R-color light. The illumination system C09 is configured as described above. The controller 120 is further connected to the image processor 140. The image processor 140 includes a G-image combiner 142, a B-image interpolator 144, and an R-image interpolator 146. The controller 120 and the image processor 140 may be implemented by a single computer system.

In the present embodiment, through the operation of the controller 120, the sample slice is illuminated with the G-color light, serving as the illumination light, successively in different illumination directions, and multiple C images are obtained by the image sensor while the sample slice is being illuminated with the C-color light. The data of the G images is transmitted to the C-image combiner 142 of the image processor 140. In addition, the sample slice is illuminated with the B-color light, serving as the illumination light, in a single direction, and a single B image is obtained by the image sensor while the sample slice is being illuminated with the B-color light. The data of the B image is transmitted to the B-image interpolator 144 of the image processor 140. Furthermore, the sample slice is illuminated with the R-color light, serving as the illumination light, in a single direction, and a single R image is obtained by the image sensor while the sample slice is being illuminated with the R-color light. The data of the R image is transmitted to the R-image interpolator 146 of the image processor 140.

The G-image combiner 142 combines the G images to generate a high-resolution image having a resolution that is higher than the resolution of each of the G images. For example, if the number of pixels in each G image is 2000×1000, a high-resolution G image having 4000×2000 pixels is obtained by combining four of the G images.

Figure 23B:
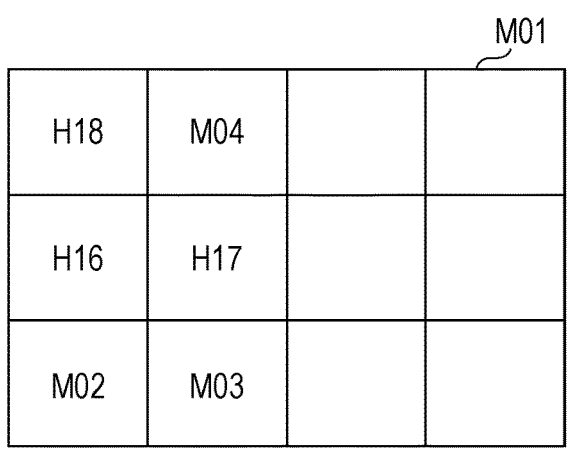
FIG. 23B schematically illustrates a biological image obtained in the illumination state illustrated in FIG. 22.

The G-image combiner 142, for example, generates a combined image by using the pixel values included in the biological image 101 (see FIG. 17B), the pixel values included in the biological image K01 (see FIG. 19B), the pixel values included in the biological image L01 (see FIG. 21B), and the pixel values included in the biological image M01 (see FIG. 23B).

Figure 24B:
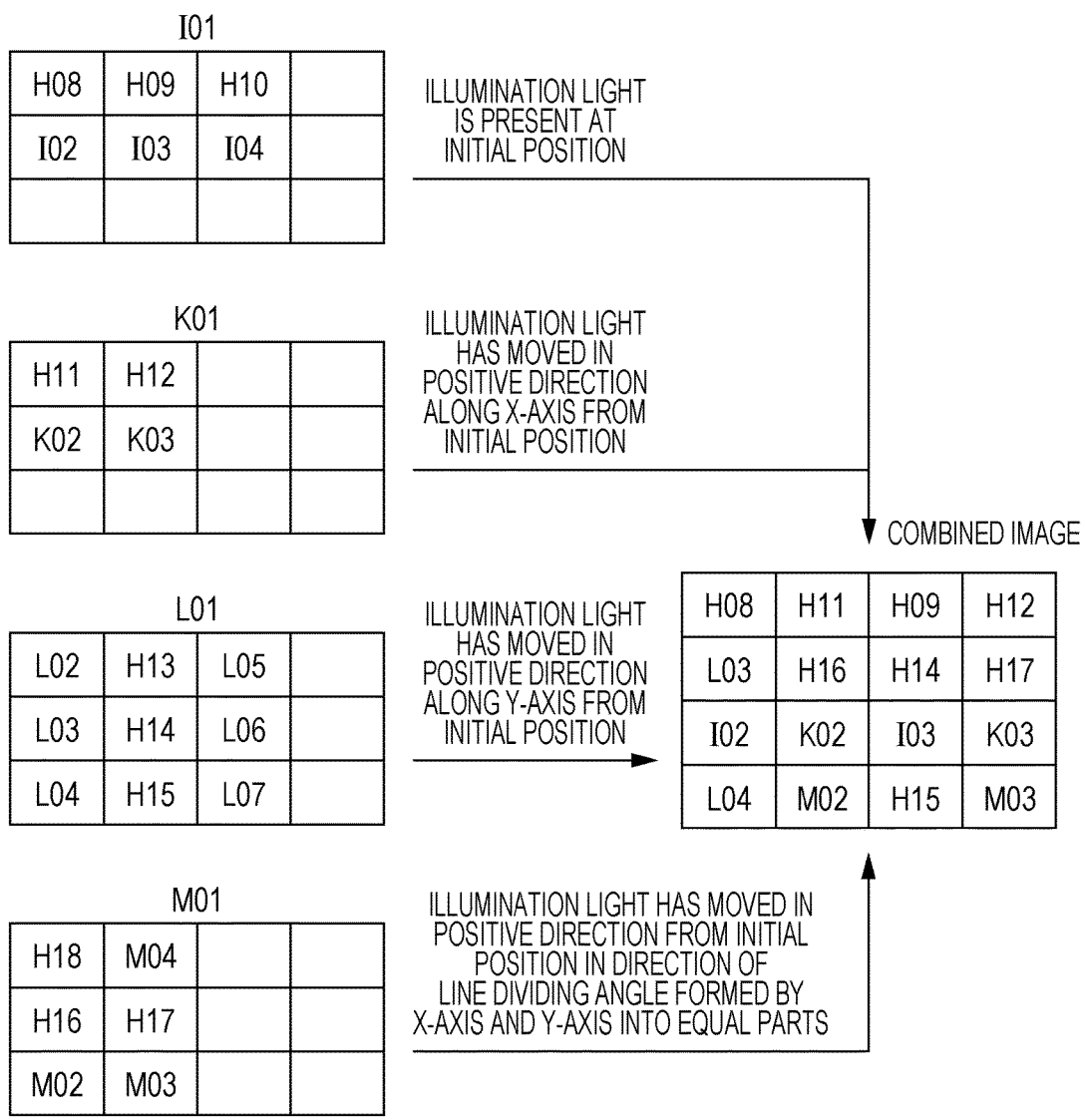
FIG. 24B illustrates an exemplary process for generating a combined image.

The G-image combiner 142 may determine where in the combined image the pixel values included in the respective biological images are applied. In this case, the G-image combiner 142 may use the positional information of the illumination light when each of the biological images has been captured (see FIG. 24B, in which only some of the pixels are illustrated).

The controller 120 may instruct the illumination system C09 as to which direction the illumination system C09 should move (the direction in the X-axis or the Y-axis from an initial position, or the direction of a line dividing an angle formed by the X-axis and the Y-axis into equal parts from the initial position) and how much to move (including positive and negative values). The illumination system C09 may move in accordance with the instruction.

The controller 120 may instruct the illumination system C09 to be located at the predetermined initial position of the illumination system C09. In this case, the movement amount may be zero. The illumination system C09 may move in accordance with the instruction from the controller.

The positional information of the illumination light may be the movement direction and the movement amount in and by which the controller 120 instructs the illumination system C09 to move, or may be the initial position. Instead of the movement amount, sign information (positive or negative) indicated by the movement amount may be used.

The B-image interpolator 144 interpolates the received data of the B image to increase the number of pixels, and generates an image having an increased number of pixels. This pixel interpolation, for example, is implemented by equally providing each pixel value in the original image to pixels of 2 rows by 2 columns. Therefore, the resolution remains unchanged even when the number of pixels increases four-fold. For example, if the number of pixels in a single B image is 2000×1000, another B image having 4000×2000 pixels is obtained by subjecting the single B image to the pixel interpolation. The resolution of the B image obtained in this manner is unchanged. The method for the pixel interpolation is not limited to this example.

The R-image interpolator 146 interpolates the received data of the R image to increase the number of pixels, and generates an image having an increased number of pixels. This pixel interpolation is similar to the pixel interpolation implemented by the B-image interpolator 144, and is implemented by equally providing each pixel value in the original image to pixels of 2 rows by 2 columns. For example, if the number of pixels in a single R image is 2000×1000, another R image having 4000×2000 pixels is obtained by subjecting the single R image to the pixel interpolation.

An image output unit 150 receives data of the G, B, and R images generated, respectively, by the G-image combiner 142, the B-image interpolator 144, and the R-image interpolator 145, and outputs a color image.

Figure 25A:
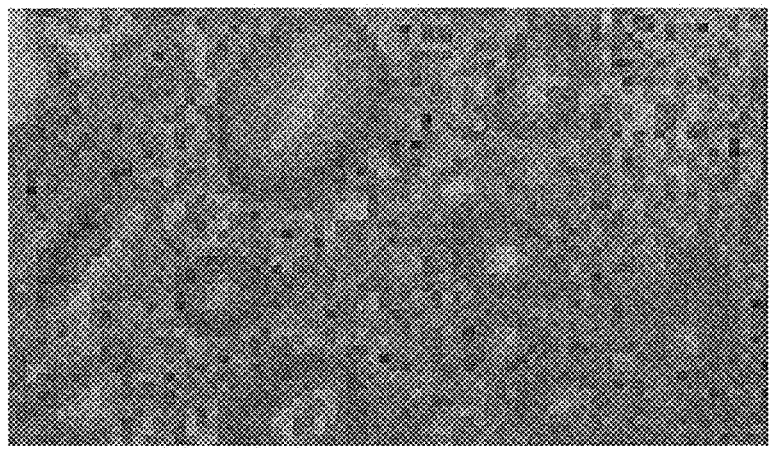
FIG. 25A illustrates an image according to a comparative example.
Figure 25B:
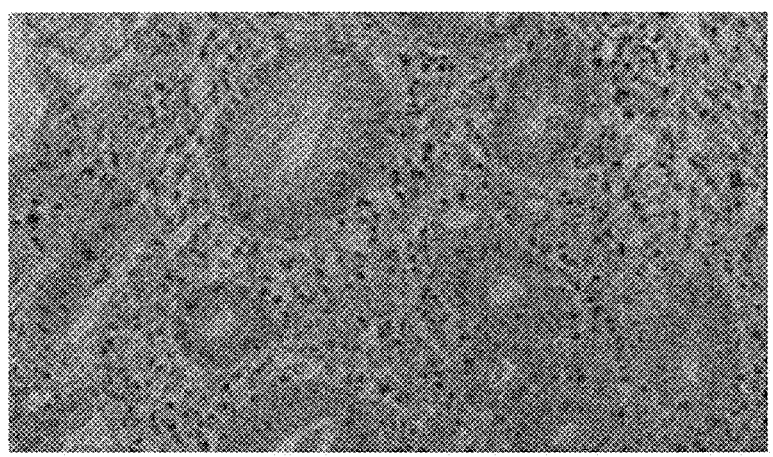
FIG. 25B illustrates an exemplary high-resolution image obtained through image processing according to the first embodiment.

FIG. 25B illustrates an exemplary high-resolution image obtained in the present embodiment. Meanwhile, FIGS. 25A and 25C each illustrate a high-resolution image according to a comparative example. FIG. 25A illustrates a high-resolution image generated from a high-resolution B image obtained by illuminating a subject with B-color light successively in four different directions and combining four captured images, a G image obtained by subjecting a single image captured while the subject is being illuminated with G-color light in one direction to the pixel interpolation, and an R image obtained by subjecting a single image captured while the subject is being illuminated with R-color light in one direction to the pixel interpolation. In addition, FIG. 25C illustrates another high-resolution image generated from a high-resolution R image obtained by illuminating a subject with R-color light successively in four different directions and combining four captured images, a G image obtained by subjecting a single image captured while the subject is being illuminated with G-color light in one direction to the pixel interpolation, and an B image obtained by subjecting a single image captured while the subject is being illuminated with B-color light in one direction to the pixel interpolation.

Figure 25C:
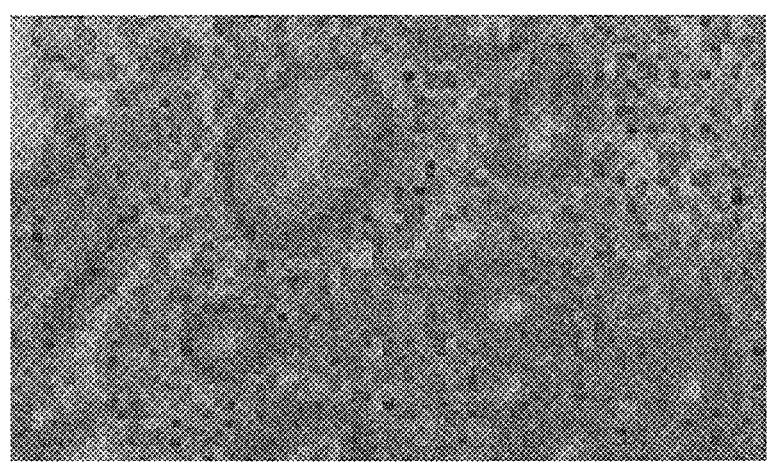
FIG. 25C illustrates another image according to the comparative example.

The comparison between the image illustrated in FIG. 25B and the images illustrated in FIGS. 25A and 25C clearly reveals that a combined image having a high resolution as a whole is obtained when the resolution of the G image is high. Therefore, it is preferable that the wavelength of light (first light) with which a subject is illuminated in a larger number of illumination directions falls in the range of green (from 495 nm to 570 nm inclusive).

Figure 26:
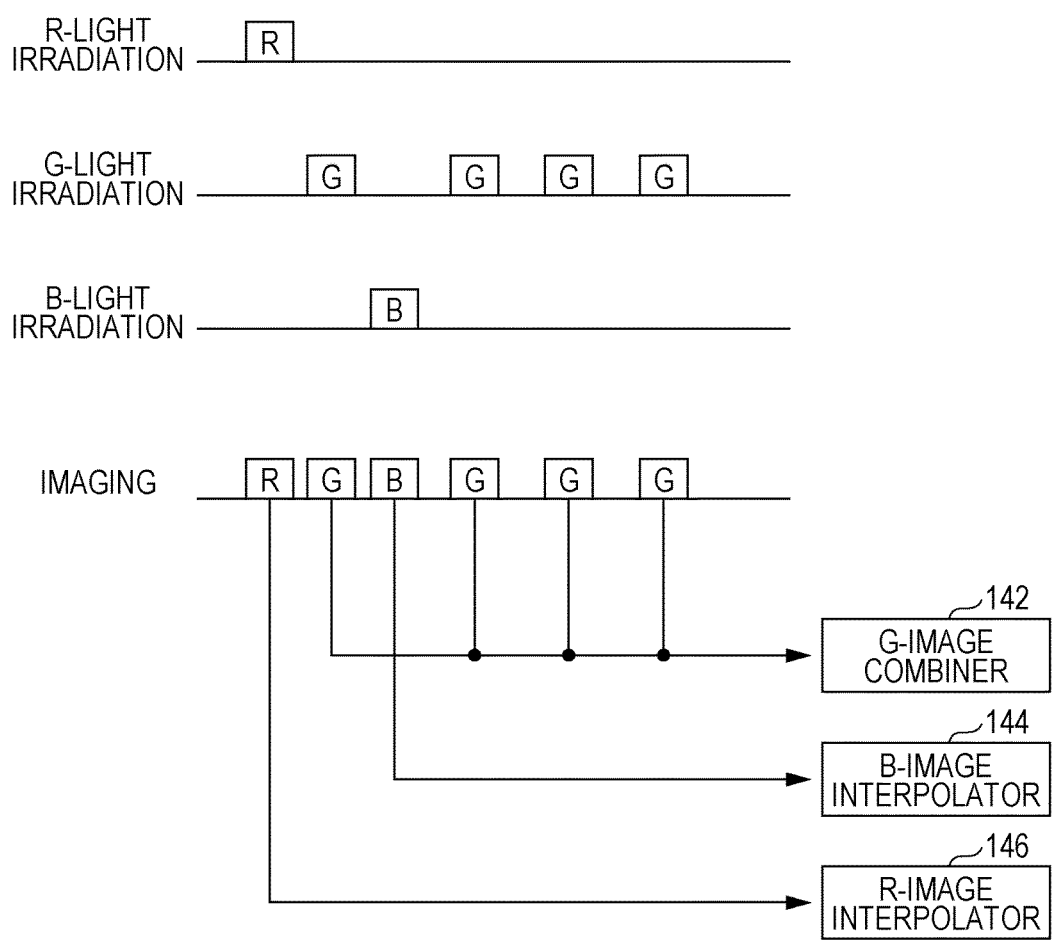
FIG. 26 is a timing chart illustrating an exemplary operation according to the first embodiment.

FIG. 26 is a timing chart illustrating an exemplary operation of an apparatus having a configuration illustrated in FIG. 24A. In the example illustrated in FIG. 26, a subject is illuminated successively with R-color light, G-color light, and B-color light in a certain direction, and images are captured at respective instances of illumination. Subsequently, the subject is illuminated with G-color light successively in different directions, and images are captured at respective instances of illumination.

Multiple G images obtained through the imaging are transmitted to the G-image combiner 142. The R image and the B image are transmitted, respectively, to the R-image interpolator 146 and the B-image interpolator 144. As can be seen clearly from FIG. 26, the number of instances of imaging while the subject is illuminated with the R-color light or the B-color light is reduced as compared with the number of instances of imaging while the subject is illuminated with the G-color light, and thus the total number of instances of imaging is reduced.

Timings at which the R image and the B image are obtained are not fixed, and are not limited to the example illustrated in FIG. 26. In addition, the number of the G images to be obtained is not limited to the example illustrated in FIG. 26. Furthermore, the prepared specimen does not need to be an electronic prepared specimen configured as described above, in order to obtain the effect of the embodiment of the present disclosure.

A variety of super-resolution techniques may be employed to combine the multiple G images obtained while the subject is being illuminated with the illumination light in different directions into a high-resolution image. For example, if an operational expression (matrix) for associating G images obtained through imaging with a target high-resolution image is known, a combined image can be obtained from images obtained through imaging by an inverse operation (inverse matrix). Such an operational expression depends on the pixel structure of the image sensor and the illumination angle of the illumination light, and can be obtained through geometrical optics, through an experiment, or through a simulation.

(Second Embodiment)

Figure 27:
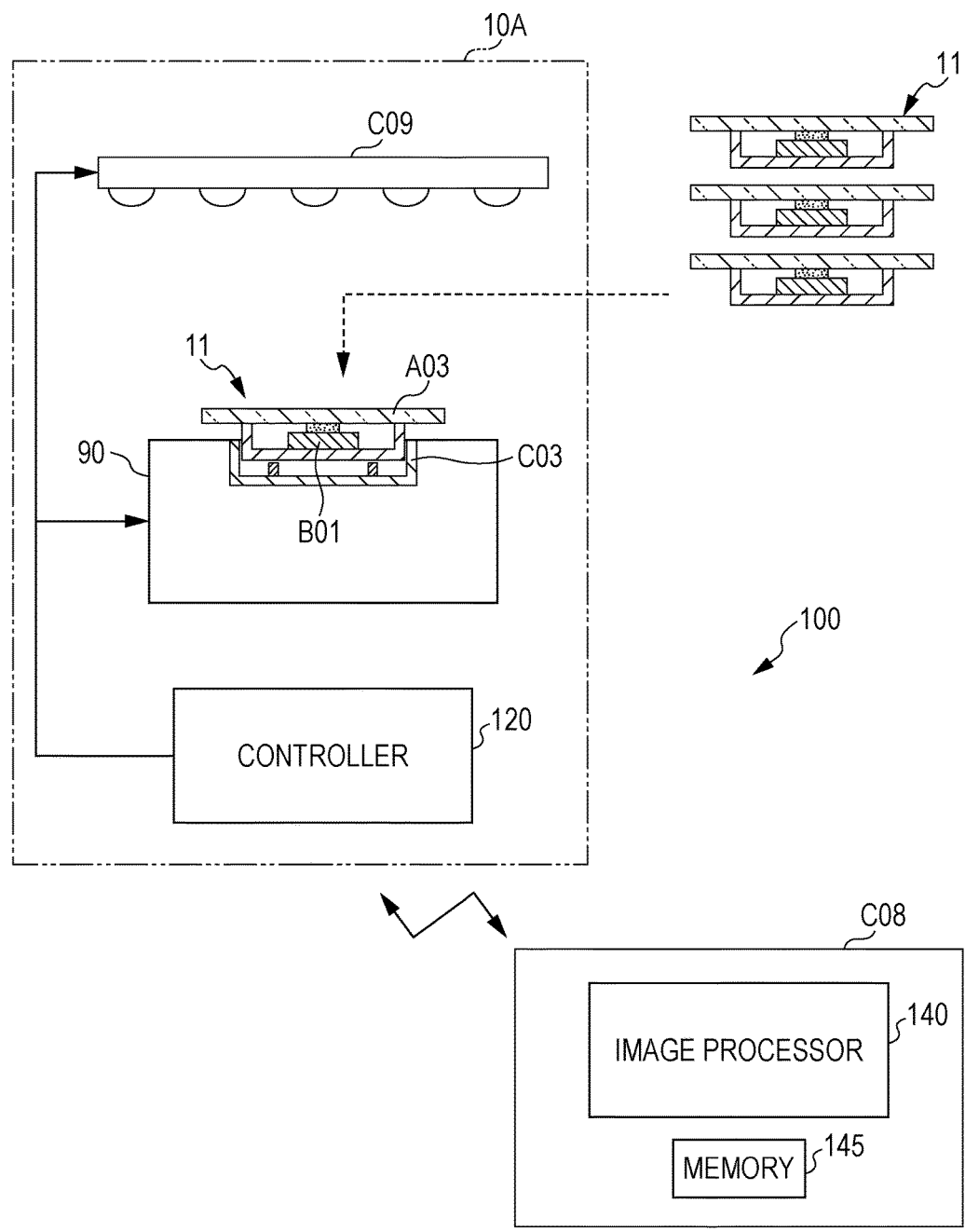
FIG. 27 is a schematic diagram illustrating an exemplary configuration of an image forming system according to a second embodiment of the present disclosure.

As described with reference to FIG. 8, the computer C06 may be a device that is separate from the imager 90 and/or the illumination system C09. FIG. 27 schematically illustrates an example of an image forming system configured in this manner. An image forming system 100 illustrated in FIG. 27 includes the imager 90, the illumination system C09, and a computer C08. In the configuration of the image forming system 100 illustrated in FIG. 27, an image acquisition apparatus 10A and the computer C08 are interconnected. The image acquisition apparatus 10A includes the imager 90, the illumination system C09, and the controller 120 that controls the imager 90 and the illumination system C09. The computer C08 includes the image processor 140 and the memory 145. The image acquisition apparatus 10A and the computer C08 are interconnected through a cable or wirelessly. The computer C08 and the image acquisition apparatus 10A may be disposed at the same location, or the computer C08 may be disposed at a location spaced apart from the image acquisition apparatus 10A. For example, the image acquisition apparatus 10A and the computer C08 may be interconnected through a network, such as the Internet. The computer C08 here is an independent apparatus. Alternatively, the computer C08 may be circuitry, such as a processor, mounted in a device. The computer C08 and the computer C06 described above may each be implemented by a general-purpose computer or a dedicated computer (or a general-purpose processor or a dedicated processor).

The operation of the image forming system 100 is substantially the same as the operation of the image forming apparatus 10 described above. Upon the prepared specimen 11 being loaded on the imager 90, the image sensor B01 in the prepared specimen 11 becomes electrically connected to the imager 90. As the prepared specimen 11 is loaded on the imager 90, the image sensor B01 is disposed at a position where light that has passed through the sample slice A05 (not illustrated in FIG. 27) is incident on the image sensor B01. The prepared specimen 11 is not an essential component of the image acquisition apparatus 10A (or the image forming apparatus 10).

The illumination system C09 emits the illumination light successively in different illumination directions relative to the sample slice in accordance with the control of the controller 120. Here, in accordance with the control of the controller 120, the image sensor B01 obtains multiple first-color images while the sample slice is being illuminated with the first light. In addition, the image sensor B01 obtains at least one second-color image while the sample slice is being illuminated with the second light. The image sensor B01 may further obtain at least one third-color image while the sample slice is being illuminated with the third light.

Image signals or image data of the subject (the sample slice in this case) obtained by the imager 90 is transmitted to the image processor 140 of the computer C08. For example, data of the G images, data of the B image, and data of the R image are transmitted to the image processor 140. The image processor 140 carries out the processing described with reference to FIG. 24A. To be more specific, the image processor 140 combines the G images to generate another high-resolution G image having a resolution that is higher than the resolution of each of the aforementioned G images. In addition, the image processor 140 interpolates the B image and the R image. The image data used in the aforementioned processing and intermediary data generated in the course of the processing may be stored temporarily in the memory 145. The image processor 140 generates a color image having a resolution that is higher than the resolution of each of the aforementioned G images on the basis of the G image that has been processed to increase the resolution thereof and the B and R images that have been subjected to the interpolation processing. The generated image is displayed, for example, in the display C07 (see FIG. 8). The generated image may be stored in the memory 145 or the database 148 (see FIG. 8). A program that records the above-described processes to be executed by the computer C08 is stored, for example, in the memory 145.

In the image forming system 100, the computer C08 may provide an instruction (command) for an operation of the controller 120. The controller 120 may be an independent apparatus that is separate from the imager 90, the illumination system C09, and the computer C08. The whole or part of the image processor 140 and/or the controller 120 may be implemented by a digital signal processor (DSP), an application-specific integrated circuit (ASIC), an application-specific standard product (ASSP), a field-programmable gate array (FPGA), a microcomputer, or the like. The image processor 140 and the controller 120 may be separate processors, or two or more of the processors may be included in a single processor. The memory 145 may be part of the image processor 140 and/or the controller 120.

Now, an exemplary method for changing the illumination angle relative to the sample slice is described.

Figure 28:
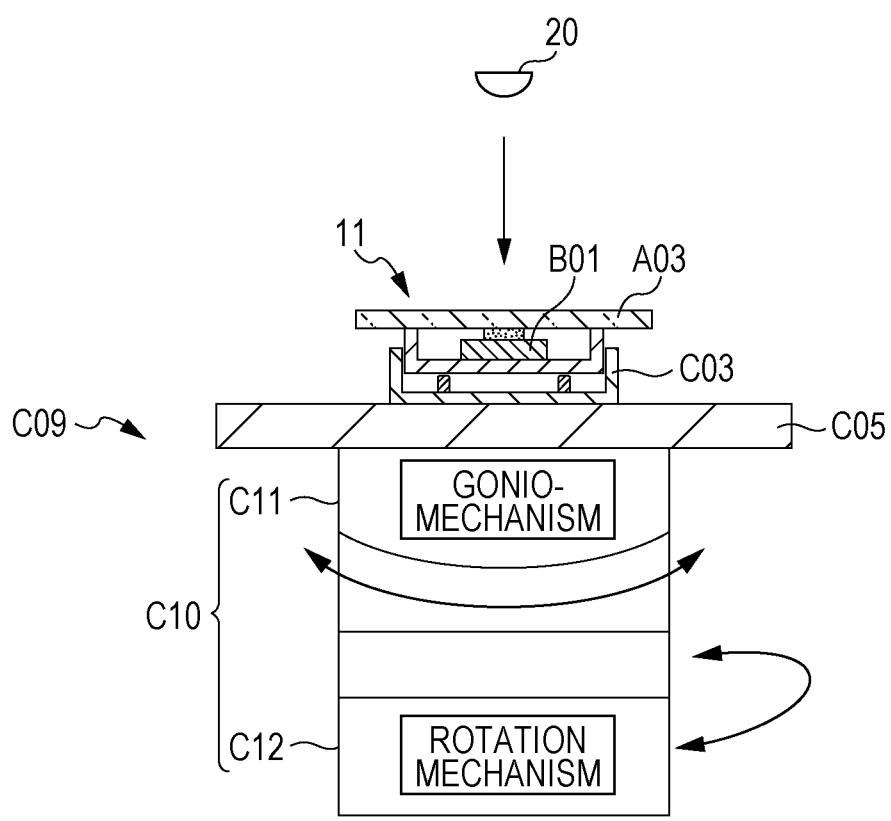
FIG. 28 is a schematic diagram illustrating an exemplary illumination system that includes an illumination angle adjustment mechanism for changing the posture of a socket.
Figure 29:
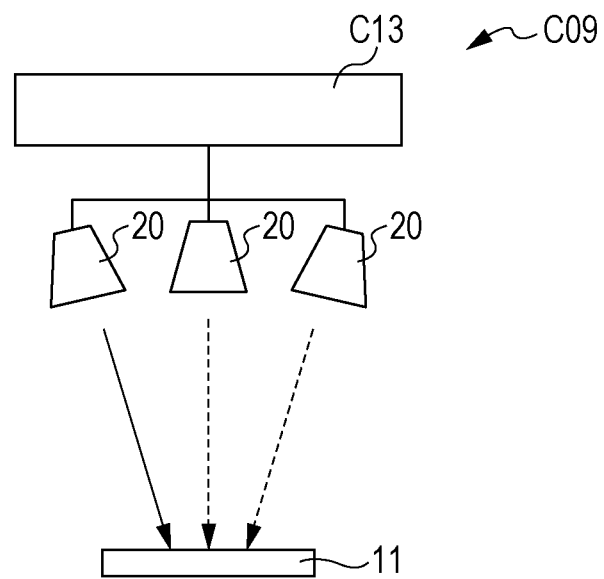
FIG. 29 is a schematic diagram illustrating an exemplary configuration of an illumination system that includes an illumination angle adjuster for adjusting the angle at which illumination light is incident on a sample slice.
Figure 30:
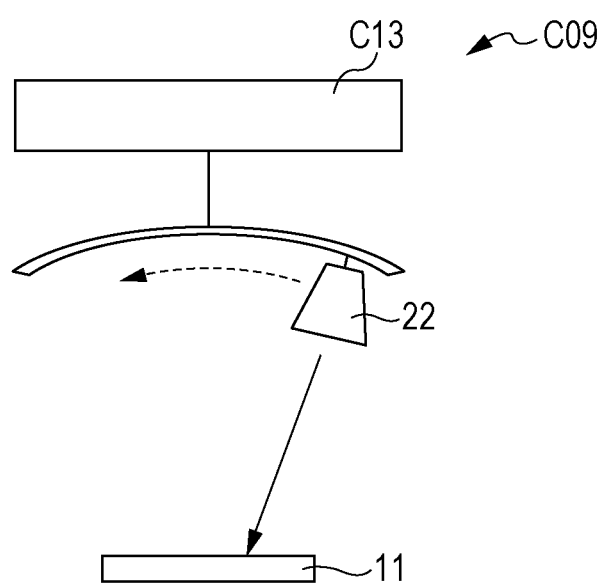
FIG. 30 is a schematic diagram illustrating another exemplary configuration of the illumination system that includes the illumination angle adjuster for adjusting the angle at which illumination light is incident on a sample slice.

FIGS. 28 through 30 illustrate exemplary configurations of the illumination system in which the arrangement of the light source element and the socket C03 can be modified. In the configuration illustrated in FIG. 28, the illumination system C09 includes an illumination angle adjustment mechanism C10 for changing the posture of the socket C03. In the example illustrated in FIG. 28, the illumination angle adjustment mechanism C10 includes a gonia-mechanism C11 that changes the tilt of the socket C03 relative to a reference plane (typically, the horizontal plane). In addition, in the example illustrated in FIG. 28, the illumination angle adjustment mechanism C10 includes a rotation mechanism C12 that changes the angle of rotation of the socket C03 relative to a reference direction. The change in the posture in the present specification includes a change in the tilt relative to the reference plane, a change in the angle of rotation relative to the reference direction, a change in the position relative to a reference point, and so on.

The gonio-mechanism C11 and/or the rotation mechanism C12 are operated in accordance with the control of the controller 120, and thus the posture of the prepared specimen 11 loaded on the socket C03 can be changed. Through this, at least one of the positions and the directions of the sample slice A05 (not illustrated in FIG. 28) and the image sensor B01 can be changed. For example, when the gonio-mechanism C11 and/or the rotation mechanism C12 are operated while the light source element is fixed, the illumination angle relative to the sample slice can be changed. The illumination angle adjustment mechanism C10 may further include a slide mechanism that translates the socket C03. The illumination angle adjustment mechanism C10 may be a desired combination of one or more gonio-mechanisms C11, the rotation mechanism C12, and the slide mechanism.

FIGS. 29 and 30 each illustrate an exemplary configuration of the illumination system C09 that includes an illumination angle adjuster for adjusting the angle at which the illumination light is incident on a sample slice. In the configuration illustrated in FIG. 29, an illumination angle adjuster C13 switches between on and off of each of a plurality of light source elements 20 disposed at mutually different positions in accordance with the control of the controller 120 (not illustrated in FIG. 29). Through this, the illumination light can be made to be incident on the image sensor B01 (not illustrated in FIG. 29) in the prepared specimen 11 at different angles. In the configuration illustrated in FIG. 30, the illumination angle adjuster C13 changes the position at which a light source element 22 is lit by moving the light source element 22, for example, along a guide rail in accordance with the control of the controller 120 (not illustrated in FIG. 30). Through such a configuration as well, the illumination light can be made to be incident on the image sensor B01 (not illustrated in FIG. 30) in the prepared specimen 11 at different angles. By making the illumination light be incident on the image sensor in the prepared specimen 11 at different angles, the angle of incidence of the illumination light on the sample slice can be adjusted such that the illumination light emitted successively in different illumination directions passes through a different portion of the sample slice and is incident on the photoelectric converters of the image sensor.

As a mechanism for moving the light source element 22, at least one of the gonio-mechanism C11, the rotation mechanism C12, and the slide mechanism described above may be employed. The various mechanisms described above may be implemented by using a known mechanism, such as a combination of a ball screw and a stepping motor, or the like.

The present disclosure can be applied, for example, to a specimen management apparatus for managing specimens.

What is claimed is:

1. An image forming apparatus, comprising:
an imager electrically connected to an image sensor;
an illumination system that emits first pieces of light and second one or more pieces of light, each of the first pieces of light having a peak in a first wavelength, any two of pieces of light included in the first pieces of light coming from different directions to a sample slice, each of the second one or more pieces of light having a peak in a second wavelength, any two of pieces of light included in the second one or more pieces of light coming from different directions to the sample slice, the illumination system not emitting any two or more pieces of light included in the first pieces of light and the second one or more pieces of light at a same time, the first pieces of light including first light coming from a first direction to the sample slice and third light coming from a second direction to the sample slice, the second one or more pieces of light including second light coming from the first direction to the sample slice;

a controller connected to the imager and to the illumination system, the controller controlling the imager and the illumination system; and an image processor that obtains data of a plurality of images, including a first image, a second image, and a third image, from the image sensor and combines the plurality of images to generate a high-resolution image of the sample slice, the high-resolution image having a resolution higher than a resolution of each of the plurality of images, wherein the controller obtains a plurality of first-color images including the first image and the third image from the imager, the image sensor obtaining the plurality of first-color images when the illumination system emits the first pieces of light, the plurality of first-color images each corresponding to the first pieces of light, the first image corresponding to the first light, the third image corresponding to the third light, and obtains one or more second-color images including the second image from the imager, the image sensor obtaining the one or more second-color images when the illumination system emits the second one or more pieces of light, the one or more second-color images each corresponding to the second one or more pieces of light, the second image corresponding to the second light, wherein the image processor generates the high-resolution image on the basis of the plurality of first-color images and the one or more second-color images, wherein (i) when the illumination system emits the first light, a first portion of the sample slice emits first resulting light based on the first light and (ii) a first pixel included in the image sensor receives the first resulting light and outputs data included in the first image, wherein (iii) when the illumination system emits the second light, the first portion of the sample slice emits second resulting light based on the second light and (iv) the first pixel receives the second resulting light and outputs data included in the second image, wherein (v) when the illumination system emits the third light, a second portion of the sample slice emits third resulting light based on the third light and (vi) the first pixel receives the third resulting light and outputs data included in the third image, wherein the second portion touches the first portion, and wherein the illumination system does not emit fourth light having a peak in the second wavelength range and coming from the second direction to the sample slice, thereby the image processor using no data based on forth resulting light to generates the high-resolution due to the second portion neither receiving fourth light nor emitting fourth resulting light based on a fourth light.

2. The image forming apparatus according to claim 1, wherein the imager
   releasably supports a prepared specimen, the prepared specimen including the sample slice and the image sensor, and
   is electrically connected to the image sensor in a state in which the imager supports the prepared specimen.

3. The image forming apparatus according to claim 1, wherein the first pieces of light includes fifth light and sixth light,
wherein the plurality of images includes a fifth image and a sixth image,
wherein the plurality of first-color images includes the fifth image and the sixth image, the fifth image corresponding to the fifth light, the sixth image corresponding to the sixth light,
wherein (vii) when the illumination system emits the fifth light, a third portion of the sample slice emits fifth resulting light based on the fifth light and (viii) the first pixel receives the fifth resulting light and outputs data included in the fifth image,
wherein (ix) when the illumination system emits the sixth light, a fourth portion of the sample slice emits sixth resulting light based on the sixth light and (x) the first pixel receives the sixth resulting light and outputs data included in the sixth image,
wherein the third portion touches the first portion and the fourth portion, and
wherein the fourth portion touches the second portion.

4. The image forming apparatus according to claim 1,
wherein the illumination system emits seventh one or more pieces of light, each of the seventh one or more pieces of light having a peak in a third wavelength range, any two of pieces of light included in the seventh one or more pieces of light coming from different directions to the sample slice, the seventh one or more pieces of light including seventh light coming from the first direction to the sample slice,
wherein the plurality of images includes a seventh image,
wherein the controller obtains one or more third-color images including the seventh image from the imager, the image senor obtaining the one or more third-color images when the illumination system emits the seventh one or more pieces of light, the one or more third-color images each corresponding to the seventh one or more pieces of light, the seventh image corresponding to the seventh light,
wherein the image processor generates the high-resolution image further on the basis of the one or more third-color images.

5. The image forming apparatus according to claim 1,
wherein each of the first pieces of light has a wavelength in a range of 495 nm to 570 nm inclusive, and each of the second pieces of light has one of a wavelength in a range of 620 nm to 750 nm inclusive and a wavelength in a range of no less than 450 nm to less than 495 nm.

6. The image forming apparatus according to claim 4,
wherein each of the first pieces of light has a wavelength in a range of 495 nm to 570 nm inclusive, each of the second pieces of light has a wavelength in a range of 620 nm to 750 nm inclusive, and each of the third pieces of light has a wavelength in a range of no less than 450 nm to less than 495 nm.

7. The image forming apparatus according to claim 1,
wherein the illumination system includes a light source that emits the first pieces of light and the second one or more pieces of light, the light source being moved to different positions to emit the first pieces of light from the different directions to the sample slice and to one or more different positions to emit the second one or more pieces of light from the different directions to the sample slice.

8. The image forming apparatus according to claim 1,
wherein the illumination system includes first light sources and one or more second light sources, the first light sources emitting first pieces of light, the first light sources being disposed at different positions to emit the first pieces of light from the different directions to the sample slice, and wherein the second one or more light sources emitting the second one or more pieces of light, the second one or more light sources each corresponding to the second one or more pieces of light, the second one or more light sources being disposed at different positions to emit the second one or more pieces of light from the different directions to the sample slice.

9. The image forming apparatus according to claim 1, wherein the illumination system includes a mechanism that changes at least one of positions and directions of the sample slice and the image sensor.

10. The image forming apparatus according to claim 1, further comprising:
an illumination angle adjuster that adjusts an angle at which each of the first pieces of light is incident on the sample slice and an angle at which each of the second one or more pieces of light is incident on the sample slice.

11. An image forming method, comprising:
emitting first pieces of light and second one or more pieces of light, each of the first pieces of light having a peak in a first wavelength, any two of pieces of light included in the first pieces of light coming from different directions to a sample slice, each of the second one or more pieces of light having a peak in a second wavelength, any two of pieces of light included in the second one or more pieces of light coming from different directions to the sample slice, and not emitting any two or more pieces of light included in the first pieces of light and the second one or more pieces of light at a same time, the first pieces of light including first light coming from a first direction to the sample slice and third light coming from a second direction to the sample slice, the second one or more pieces of light including second light coming from the first direction to the sample slice;
obtaining a plurality of images, including a first image, a second image, and a third image, corresponding to the respective different illumination directions with an image sensor, the image sensor being disposed at a position where light that has passed through the sample slice is incident on the image sensor; and
generating a high-resolution image of the sample slice by combining the plurality of images, the high-resolution image having a resolution higher than a resolution of each of the plurality of images,
wherein the illuminating of the sample slice with the illumination light includes
illuminating the sample slice with a first light having a peak in a first wavelength range in the different illumination directions, and
illuminating the sample slice with a second light having a peak in a second wavelength range in at least one of the different illumination directions, and
wherein the obtaining of the plurality of images includes
obtaining a plurality of first-color images including the first image and the third image from the imager, obtaining the plurality of first-color images when the first pieces of light are emitted, the plurality of first-color images each corresponding to the first pieces of light, the first image corresponding to the first light, the third image corresponding to the third light,
obtaining one or more second-color images including the second image from the imager, obtaining the one or more second-color images when the second one or more pieces of light is emitted, the one or more second-color images each corresponding to the second one or more pieces of light, the second image corresponding to the second light wherein (i) when the first light is emitted, a first portion of the sample slice emits the first resulting light based on the first light and (ii) a first pixel included in the image sensor receives the first resulting light and outputs data included in the first image, wherein (iii) when the second light is emitted, the first portion of the sample slice emits the second resulting light based on the second light and (iv) the first pixel receives the second resulting light and outputs data, included in the second image, wherein (v) when the third light is emitted, a second portion of the sample slice emits the third resulting light based on the third light and (vi) the first pixel receives the third resulting light and outputs data included in the third image, wherein the second portion touches the first portion, and wherein the emitting does not emit fourth light having a peak in the second wavelength range and coming from the second direction to the sample slice, thereby no data based on forth resulting light is used to generate the high-resolution image due to the second portion neither receiving the fourth light nor emitting the fourth resulting light based on a fourth light.

12. An image forming system, comprising:
an imager electrically connected to an image sensor, the image sensor being disposed at a position where light that has passed through a sample slice is incident on the image sensor;
an illumination system that emits first pieces of light and second one or more pieces of light, each of the first pieces of light having a peak in a first wavelength, any two of pieces of light included in the first pieces of light coming from different directions to a sample slice, each of the second one or more pieces of light having a peak in a second wavelength, any two of pieces of light included in the second one or more pieces of light coming from different directions to the sample slice, the illumination system not emitting any two or more pieces of light included in the first pieces of light and the second one or more pieces of light at a same time, the first pieces of light including first light coming from a first direction to the sample slice and third light coming from a second direction to the sample slice, the second one or more pieces of light including second light coming from the first direction to the sample slice; and
a computer,
wherein the computer executes
obtaining a plurality of images, including a first image, a second image, and a third image, corresponding to the respective different illumination directions with an image sensor, the image sensor being disposed at a position where light that has passed through the sample slice is incident on the image sensor; and
generating a high-resolution image of the sample slice by combining the plurality of images, the high-resolution image having a resolution higher than a resolution of each of the plurality of images,
wherein the illuminating of the sample slice with the illumination light includes
illuminating the sample slice with a first light having a peak in a first wavelength range in the different illumination directions, and illuminating the sample slice with a second light having a peak in a second wavelength range in at least one of the different illumination directions, and wherein the obtaining of the plurality of images includes
obtaining a plurality of first-color images including the first image and the third image from the imager, obtaining the plurality of first-color images when the first pieces of light are emitted, the plurality of first-color images each corresponding to the first pieces of light, the first image corresponding to the first light, the third image corresponding to the third light, obtaining one or more second-color images including the second image from the imager, obtaining the one or more second-color images when the second one or more pieces of light is emitted, the one or more second-color images each corresponding to the second one or more pieces of light, the second image corresponding to the second light wherein (i) when the first light is emitted, a first portion of the sample slice emits the first resulting light based on the first light and (ii) a first pixel included in the image sensor receives the first resulting light and outputs data included in the first image, wherein (iii) when the second light is emitted, the first portion of the sample slice emits the second resulting light based on the second light and (iv) the first pixel receives the second resulting light and outputs data, included in the second image, wherein (v) when the third light is emitted, a second portion of the sample slice emits the third resulting light based on the third light and (vi) the first pixel receives the third resulting light and outputs data included in the third image, wherein the second portion touches the first portion, and wherein the emitting does not emit fourth light having a peak in the second wavelength range and coming from the second direction to the sample slice, thereby no data based on forth resulting light is used to generate the high-resolution image due to the second portion neither receiving the fourth light nor emitting the fourth resulting light based on a fourth light.

13. An image forming method, comprising:

emitting first pieces of light and second one or more pieces of light, each of the first pieces of light having a peak in a first wavelength, any two of pieces of light included in the first pieces of light coming from different directions to a sample slice, each of the second one or more pieces of light having a peak in a second wavelength, any two of pieces of light included in the second one or more pieces of light coming from different directions to the sample slice, and not emitting any two or more pieces of light included in the first pieces of light and the second one or more pieces of light at a same time, the first pieces of light including first light coming from a first direction to the sample slice and third light coming from a second direction to the sample slice, the second one or more pieces of light including second light coming from the first direction to the sample slice, the first light emitted in the first illumination direction passing through a first portion of a sample to emit a first resulting light from the first portion, the second light emitted in the first illumination direction passing through the first portion of the sample to emit a second resulting light from the first portion, and the third light emitted in the second illumination direction passing through a second portion of the sample to emit a third resulting light from the second portion;

obtaining first direction data showing that the first light is emitted in the first illumination direction;

receiving the first resulting light on an image sensor;

outputting first image data based on the received first resulting light by the image sensor;

obtaining second direction data showing that the second light is emitted in the first illumination direction;

receiving the second resulting light on the image sensor;

outputting second image data based on the received second resulting light by the image sensor;

obtaining third direction data showing that the first light is emitted in the second illumination direction;

receiving the third resulting light on the image sensor;

outputting third image data based on the received third resulting light by the image sensor; and preparing a first image based on the first data, the second data, the third data, the first illumination direction, the second illumination direction, and the third illumination direction, wherein (i) when the first light is emitted, a first portion of the sample slice emits the first resulting light based on the first light and (ii) a first pixel included in the image sensor receives the first resulting light and outputs data included in the first image, wherein (iii) when the second light is emitted, the first portion of the sample slice emits the second resulting light based on the second light and (iv) the first pixel receives the second resulting light and outputs data, included in the second image, wherein (v) when the third light is emitted, a second portion of the sample slice emits the third resulting light based on the third light and (vi) the first pixel receives the third resulting light and outputs data included in the third image, wherein the second portion touches the first portion, and wherein the emitting does not emit fourth light having a peak in the second wavelength range and coming from the second direction to the sample slice, thereby no data based on forth resulting light is used to generate the high-resolution image due to the second portion neither receiving the fourth light nor emitting the fourth resulting light based on a fourth light.

* * * * *